United States Patent
Comb et al.

(10) Patent No.: US 9,108,360 B2
(45) Date of Patent: Aug. 18, 2015

(54) GANTRY ASSEMBLY FOR USE IN ADDITIVE MANUFACTURING SYSTEM

(75) Inventors: James W. Comb, Hamel, MN (US); William J. Swanson, St. Paul, MN (US); Jeffrey L. Crotty, Coon Rapids, MN (US)

(73) Assignee: Stratasys, Inc., Eden Prairie, MN (US)

( * ) Notice: Subject to any disclaimer, the term of this patent is extended or adjusted under 35 U.S.C. 154(b) by 206 days.

(21) Appl. No.: 13/242,561

(22) Filed: Sep. 23, 2011

(65) Prior Publication Data

US 2013/0078073 A1    Mar. 28, 2013

(51) Int. Cl.
*F16H 19/06*     (2006.01)
*B29C 67/00*     (2006.01)

(52) U.S. Cl.
CPC ............ *B29C 67/0055* (2013.01); *F16H 19/06* (2013.01); *F16H 2019/069* (2013.01); *F16H 2019/0686* (2013.01); *Y10T 74/18152* (2015.01); *Y10T 74/18848* (2015.01)

(58) Field of Classification Search
USPC .......... 74/89.2, 89.21, 89.22, 490.09; 384/37, 384/38, 40
See application file for complete search history.

(56) References Cited

U.S. PATENT DOCUMENTS

| | | | |
|---|---|---|---|
| 2,785,941 A * | 3/1957 | Macklem et al. ................. 346/8 |
| 3,788,377 A * | 1/1974 | Knowles .................... 160/84.04 |
| 4,315,437 A * | 2/1982 | Etcheparre et al. .......... 74/89.22 |
| 4,457,567 A * | 7/1984 | Kraan ............................. 384/53 |
| 4,479,347 A | 10/1984 | Larsen et al. |
| 4,528,607 A * | 7/1985 | Thompson ................. 360/267.4 |
| 5,201,584 A * | 4/1993 | Simons ........................... 384/49 |
| 5,305,299 A * | 4/1994 | Maeda .......................... 720/680 |
| 5,312,224 A | 5/1994 | Batchelder et al. |
| 5,375,115 A * | 12/1994 | Shimegi et al. ............... 720/679 |
| 5,426,722 A | 6/1995 | Batchelder |
| 5,653,925 A | 8/1997 | Batchelder |
| 6,028,410 A | 2/2000 | Leavitt et al. |
| 6,067,480 A | 5/2000 | Stuffle et al. |
| 6,070,480 A * | 6/2000 | Kerschner ...................... 74/89.2 |
| 6,129,872 A | 10/2000 | Jang |
| 6,629,011 B1 | 9/2003 | Calderon et al. |
| 6,722,872 B1 | 4/2004 | Swanson et al. |
| 6,732,609 B2 * | 5/2004 | Asai et al. .................. 74/490.04 |

(Continued)

FOREIGN PATENT DOCUMENTS

GB     2 274 719      *  8/1994
WO     2009088995 A1     7/2009

OTHER PUBLICATIONS

Craig, Kevin C., "So You Want to Build an H-Bot", www.designnews.com, May 2011.

(Continued)

*Primary Examiner* — William C Joyce
(74) *Attorney, Agent, or Firm* — Westman, Champlin & Koehler, P.A.

(57) ABSTRACT

A gantry assembly for use in an additive manufacturing system, the gantry assembly comprising a first bearing shaft, a carriage slidably engaged with the first bearing shaft, and a second bearing shaft operably supported by the carriage, the second linear bearing extending along a second axis. The gantry assembly also comprises a tool-head mount slidably engaged with the second linear bearing, a drive belt secured to the tool-head mount, a first motor having a first drive shaft engaged with the drive belt, and a second motor having a second drive shaft engaged with the drive belt.

18 Claims, 24 Drawing Sheets

(56) References Cited

U.S. PATENT DOCUMENTS

| | | | |
|---|---|---|---|
| 6,866,807 B2 | 3/2005 | Comb et al. | |
| 6,869,559 B2 | 3/2005 | Hopkins | |
| 6,998,087 B1 | 2/2006 | Hanson et al. | |
| 7,297,304 B2 | 11/2007 | Swanson et al. | |
| 7,310,806 B2 * | 12/2007 | Kato et al. | 720/676 |
| 7,314,591 B2 | 1/2008 | Priedeman, Jr. | |
| 7,384,255 B2 | 6/2008 | LaBossiere et al. | |
| 7,625,200 B2 | 12/2009 | Leavitt | |
| 7,891,964 B2 | 2/2011 | Skubic et al. | |
| 2005/0173838 A1 | 8/2005 | Priedeman, Jr. et al. | |
| 2007/0221621 A1 * | 9/2007 | Fustinoni | 216/65 |
| 2007/0228590 A1 | 10/2007 | LaBossiere et al. | |
| 2007/0228592 A1 | 10/2007 | Dunn et al. | |
| 2008/0169585 A1 | 7/2008 | Zinniel | |
| 2009/0035405 A1 | 2/2009 | Leavitt | |
| 2010/0021580 A1 | 1/2010 | Swanson et al. | |
| 2010/0100224 A1 | 4/2010 | Comb et al. | |
| 2010/0283172 A1 | 11/2010 | Swanson | |
| 2010/0327479 A1 | 12/2010 | Zinniel et al. | |
| 2011/0074065 A1 | 3/2011 | Batchelder et al. | |
| 2011/0076495 A1 | 3/2011 | Batchelder et al. | |
| 2011/0076496 A1 | 3/2011 | Batchelder et al. | |
| 2011/0117268 A1 | 5/2011 | Batchelder et al. | |
| 2011/0121476 A1 | 5/2011 | Batchelder et al. | |
| 2011/0220781 A1 | 9/2011 | Batchelder | |
| 2012/0068378 A1 | 3/2012 | Swanson et al. | |
| 2012/0070523 A1 | 3/2012 | Swanson et al. | |

OTHER PUBLICATIONS

Stoney, Sam, "How a flat-panel TV handling system and the simplicity of the Etch-a-Sketch resulted in the design of a miniature, automated, two-axis laboratory sample handling system.", Fluid Power/Power Transmission, pp. F11-F12, May 2011.

* cited by examiner

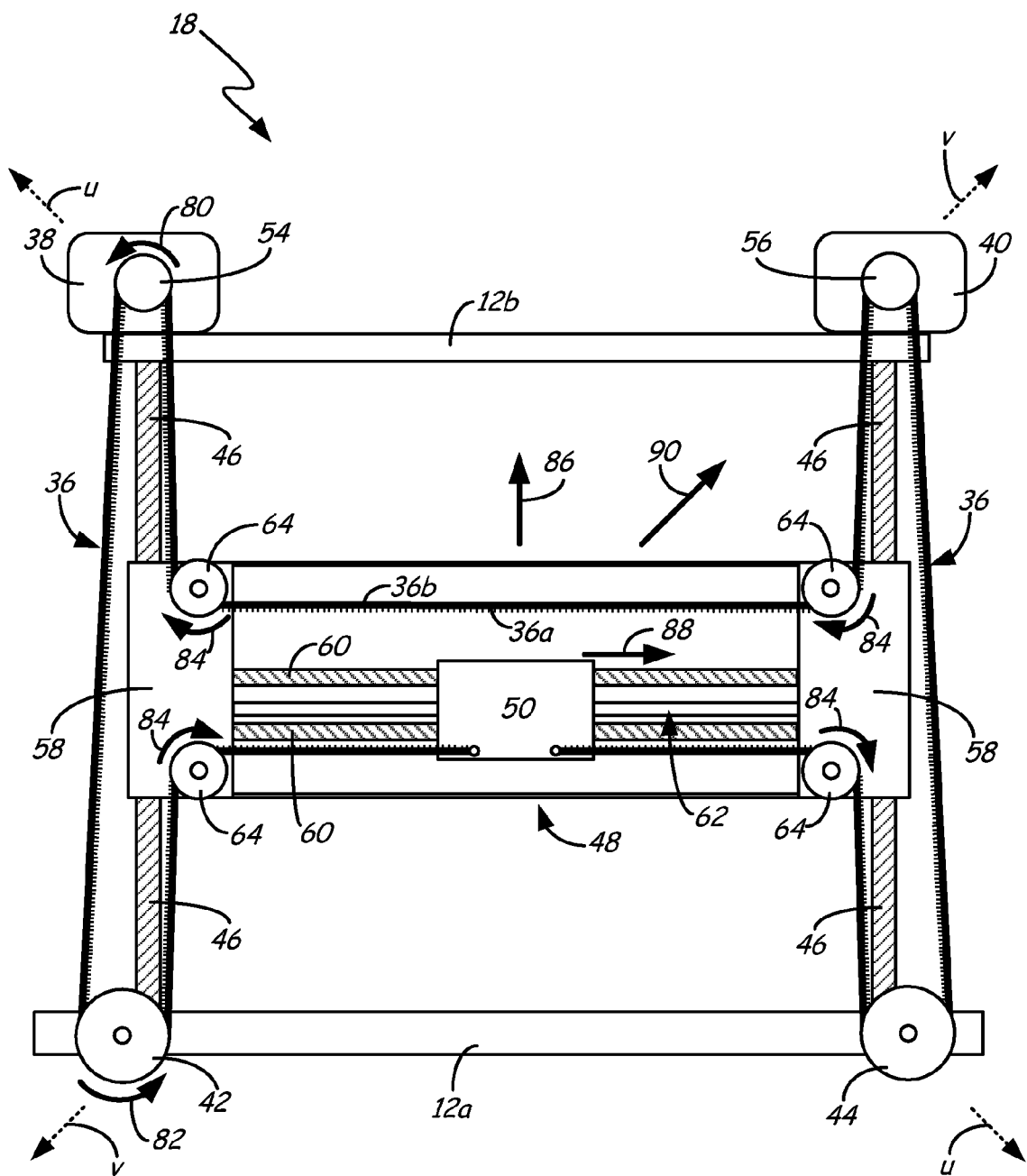
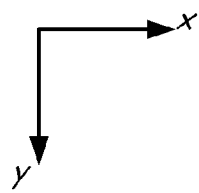
FIG. 6

GANTRY ASSEMBLY FOR USE IN ADDITIVE MANUFACTURING SYSTEM

BACKGROUND

The present disclosure relates to additive manufacturing systems for building three-dimensional (3D) parts with layer-based, additive manufacturing techniques. In particular, the present disclosure relates to gantry assemblies for carrying a tool head in additive manufacturing systems.

Various types of additive manufacturing systems are known which utilize a tool head controlled to move in space according to tool paths identified to create desired 3D parts. An extrusion-based additive manufacturing system is used to print a 3D part or model from a digital representation of the 3D part in a layer-by-layer manner by extruding a flowable part material. The tool head is a print head carrying one or more extrusion tips. The part material is extruded through an extrusion tip carried by the print head, and is deposited as a sequence of roads on a substrate in an x-y plane. The extruded part material fuses to previously deposited modeling material, and solidifies upon a drop in temperature. The position of the print head relative to the substrate is then incremented along a z-axis (perpendicular to the x-y plane), and the process is then repeated to form a 3D part resembling the digital representation.

Movement of the print head with respect to the substrate is performed under computer control, in accordance with build data that represents the 3D part. The build data is obtained by initially slicing the digital representation of the 3D part into multiple horizontally sliced layers. Then, for each sliced layer, the host computer generates a tool path for depositing roads of the part material to print the 3D part.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed. For example, support material may be deposited from a second extrusion tip carried by the print head, or from another tool head, pursuant to the generated geometry during the build process. The support material adheres to the part material during fabrication, and is removable from the completed 3D part when the build process is complete.

SUMMARY

An aspect of the present disclosure is directed to a gantry assembly that includes a first bearing shaft extending along a first axis, a carriage slidably engaged with the first bearing shaft, and a second bearing shaft operably supported by the carriage, the second bearing shaft extending along a second axis that defines a plane with the first axis. The gantry assembly also includes a tool-head mount slidably engaged with the second bearing shaft, a drive belt secured to the tool-head mount, a first motor having a first drive shaft engaged with the drive belt, and a second motor having a second drive shaft engaged with the drive belt. The first motor and the second motor are configured to operate independently to rotate the drive belt in manners that move the carriage along the first bearing shaft and that move the head-tool mount along the second bearing shaft based on relative rotational directions and rotational rates between the first drive shaft and the second drive shaft, so as to allow movement of the tool-head mount to any coordinate location within the plane. The gantry assembly is also configured to reduce pivoting of the carriage in the plane.

Another aspect of the present disclosure is directed to a gantry assembly for use in an additive manufacturing system having a housing frame. The gantry assembly includes a first pair of bearing shafts operably supported by the housing frame, and a carriage slidably engaged with the first pair of bearing shafts and configured to move along the first pair of bearing shafts, where the slidable engagement between carriage and the first pair of bearing shafts biases at least one bearing shaft of the first pair of bearing shafts in a direction that is substantially orthogonal to a longitudinal length of the at least one bearing shaft. The gantry assembly also includes a second pair of bearing shafts operably supported by the carriage, the second pair of bearing shafts being substantially orthogonal to the first pair of bearing shafts, and a head-tool mount slidably engaged with the second pair of bearing shafts and configured to move along the second pair of bearing shafts. The gantry assembly further includes a drive belt secured to the head-tool mount, a first motor operably retained by the housing frame and engaged with the drive belt, and a second motor operably retained by the housing frame and engaged with the drive belt. The first motor and the second motor are configured to operate independently of each other to rotate the drive belt in manners that move the carriage along the first pair of bearing shafts and that move the head-tool mount along the second pair of bearing shafts based on relative rotational directions and rotational rates between the first drive shaft and the second drive shaft, so as to allow movement of the tool-head mount to any coordinate location within a planar workspace.

Another aspect of the present disclosure is directed to a method for operating a gantry assembly in an additive manufacturing system. The method includes providing a drive belt that is engaged with a first drive shaft of a first motor, a second drive shaft of a second motor, a first pulley, a second pulley, and plurality of third pulleys, the plurality of third pulleys being rotatably mounted to a carriage that is slidable along a first axis, where the drive belt is also secured to a tool-head mount that is supported by the carriage and that is slidable along a second axis relative to the carriage, and where the second axis is substantially orthogonal to the first axis. The method also includes selectively operating the first drive motor and the second drive motor independently of each other to rotate the drive belt in manners that move the carriage in directions along the first axis, that move the tool-head mount in directions along the second axis relative to the carriage, or combinations thereof, so as to move the tool-head mount to any desired coordinate location within a plane defined by the first axis and the second axis. The method further includes reducing pivoting of the carriage in the plane while selectively operating the first drive motor and the second drive motor.

BRIEF DESCRIPTION OF THE DRAWINGS

FIG. 6 is a top schematic view of the gantry assembly being operated in a second manner to move the tool-head mount in a rear right direction along the v-axis.

DETAILED DESCRIPTION

The present disclosure is directed to a tool-head gantry assembly for use in an additive manufacturing system. The gantry assembly is configured to move a tool head (e.g., a print head or a print head assembly) in a two-dimensional plane with the use of a single drive belt and multiple motors that are configured to operate independently of each other. As discussed below, the gantry assembly may accurately position a tool head (e.g., a print head) in a two-dimensional plane based on the relative rotational directions and rotational rates (i.e., speeds) of drive shafts of the multiple motors, which dictate the rotational movement of the single drive belt.

Figure 1:
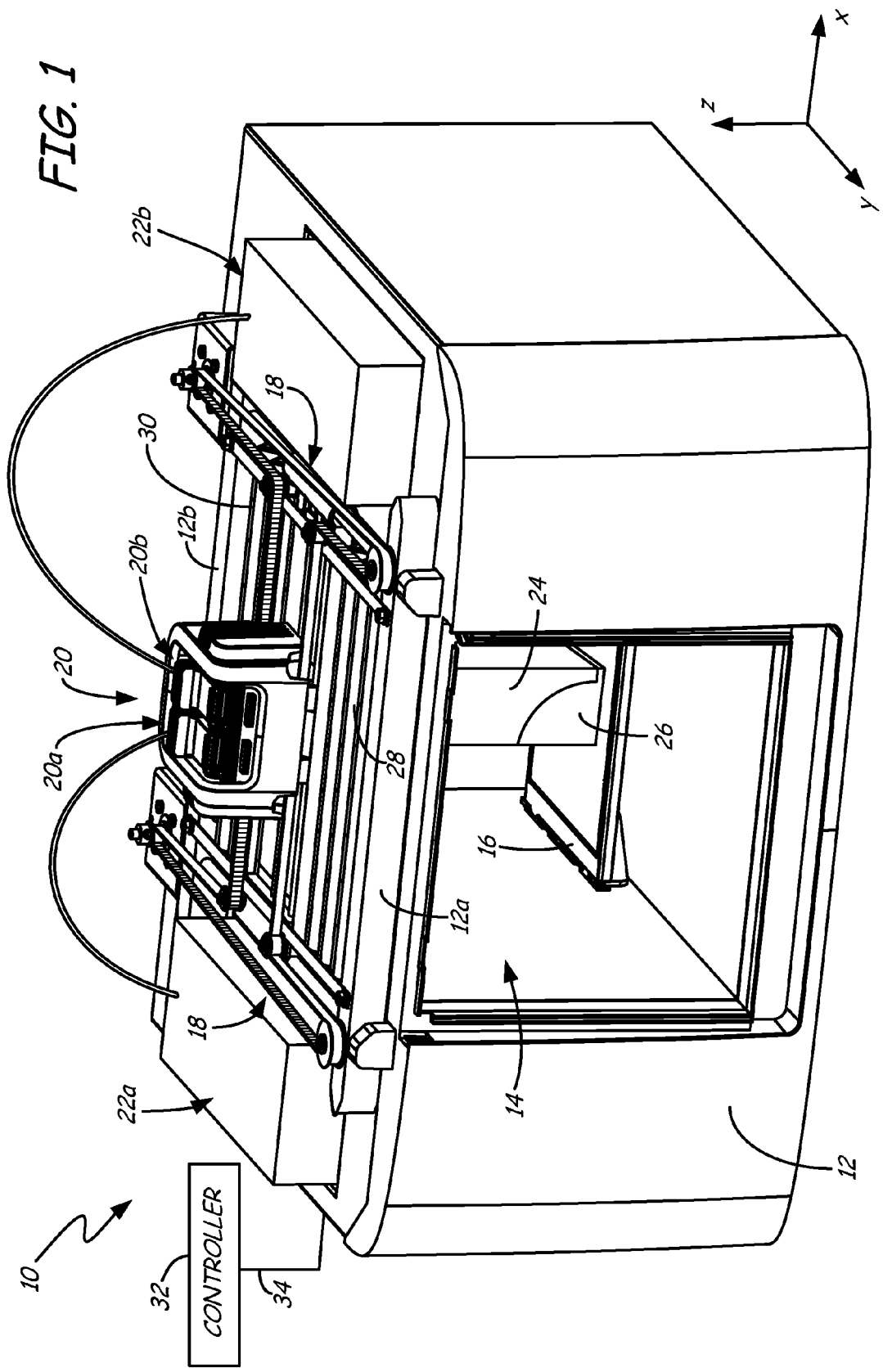
FIG. 1 is a top perspective view of an additive manufacturing system, which includes a gantry assembly of the present disclosure.

FIG. 1 is a perspective view of system 10, which is an example of an additive manufacturing system that may incorporate the gantry assembly of the present disclosure. Suitable additive manufacturing systems for system 10 include those developed by Stratasys, Inc., Eden Prairie, MN. As shown, system 10 includes housing frame 12, build chamber 14, platen 16, and gantry 18 of the present disclosure; and is shown in use with print head assembly 20 (which includes print heads 20a and 20b) and consumables assemblies 22a and 22b. Examples of suitable components for housing frame 12, build chamber 14, platen 16, print head assembly 20, and consumables assemblies 22a and 22b include those disclosed in Swanson et al., U.S. Pat. No. 8,419,996; Swanson, U.S. Patent Application Publication No. 2010/0283172; and Swanson, International Publication No. WO2009/088995.

Housing frame 12 is a structural component of system 10 and may include multiple structural sub-components such as support frames, housing walls, and the like, including front retention beam 12a and rear retention beam 12b. In the shown embodiment, housing frame 12 defines the dimensions of build chamber 14. Build chamber 14 is an enclosed environment that contains platen 16 for building a 3D part or model 24 and a corresponding support structure 26 with part and support consumable materials (e.g., thermoplastic materials).

Build chamber 14 may be heated to reduce the rate at which the part and support materials solidify after being extruded and deposited (e.g., to reduce distortions and curling). In this embodiment, system 10 may also include thermal baffles 28 and 30, which are collapsible baffles that form portions of the ceiling of build chamber 14. The collapsible arrangement of thermal baffles 28 and 30 allows gantry assembly 18 to move print head assembly 20 back-and-forth along a y-axis, while maintaining a thermal barrier for build chamber 14, as discussed in Swanson et al., U.S. Pat. No. 7,297,304. As discussed below, in one embodiment, one or both of thermal baffles 28 and 30 may be fabricated to retract in their free states and to provide good thermal insulation properties. As such, in this embodiment, thermal baffles 28 and 30 are each naturally biased towards a retracted or compressed state, which prevents thermal baffles 28 and 30 from buckling when compressed by the movement of print head assembly 20.

In alternative embodiments, build chamber 14 may be omitted and/or replaced with different types of build environments. For example, 3D part 24 and support structure 26 may be built in a build environment that is open to ambient conditions or may be enclosed with alternative structures (e.g., flexible curtains).

Platen 16 is a gantry-moveable platform on which 3D part 24 and support structure 26 are built, and moves along a vertical z-axis based on signals provided from a computer-operated controller (referred to as controller 32). Controller 32 is one or more processor-based controllers, which may communicate with build chamber 14, platen 16, gantry assembly 18, and print head assembly 20 over communication line 34. While illustrated as a single signal line, communication line 34 may include one or more signal lines, allowing controller 32 to communicate with various components of system 10. Furthermore, while illustrated outside of system 10, controller 32 and communication line 34 may be internal components to system 10.

Gantry assembly 18 is a bearing-shaft gantry mechanism configured to retain and move print head assembly 20 in a horizontal x-y plane above build chamber 12 based on signals provided from controller 32 (via communication line 34), as discussed below. The horizontal x-y plane is a plane defined by an x-axis and the y-axis, where the x-axis, the y-axis, and the z-axis are orthogonal to each other. While gantry assembly 18 is discussed herein as operating in the horizontal x-y plane, in alternative embodiments, gantry assemblies of the present disclosure may be configured to move one or more tool heads in any two-dimensional plane.

During operation, controller 32 directs gantry assembly 18 to move print head assembly 20 around in the x-y plane above build chamber 14, as discussed below. Additionally, controller 32 may direct the part and support materials to be selectively fed from consumable assemblies 22a and 22b to print head assembly 20. Print head 20a of print head assembly 20 thermally melts the successive portions of the received part material, thereby allowing the molten part material to be extruded and deposited on to platen 16 to build 3D part 24. Similarly, print head 20b of print head assembly 20 thermally melts the successive portions of the support material, thereby allowing the molten support material to be extruded and deposited on to platen 16 to build support structure 26.

The extruded part and support materials are deposited onto platen 16 to build 3D part 24 and support structure 26 in a layer-based manner using the fused deposition modeling technique. Support structure 26 is desirably deposited to provide vertical support along the z-axis for overhanging regions of the layers of 3D part 24. After the build operation is complete, the resulting 3D part 24 and support structure 26 may be removed from build chamber 14, and support structure 26 may be removed from 3D part 24. 3D part 24 may then undergo one or more additional post-processing steps.

Figure 2:
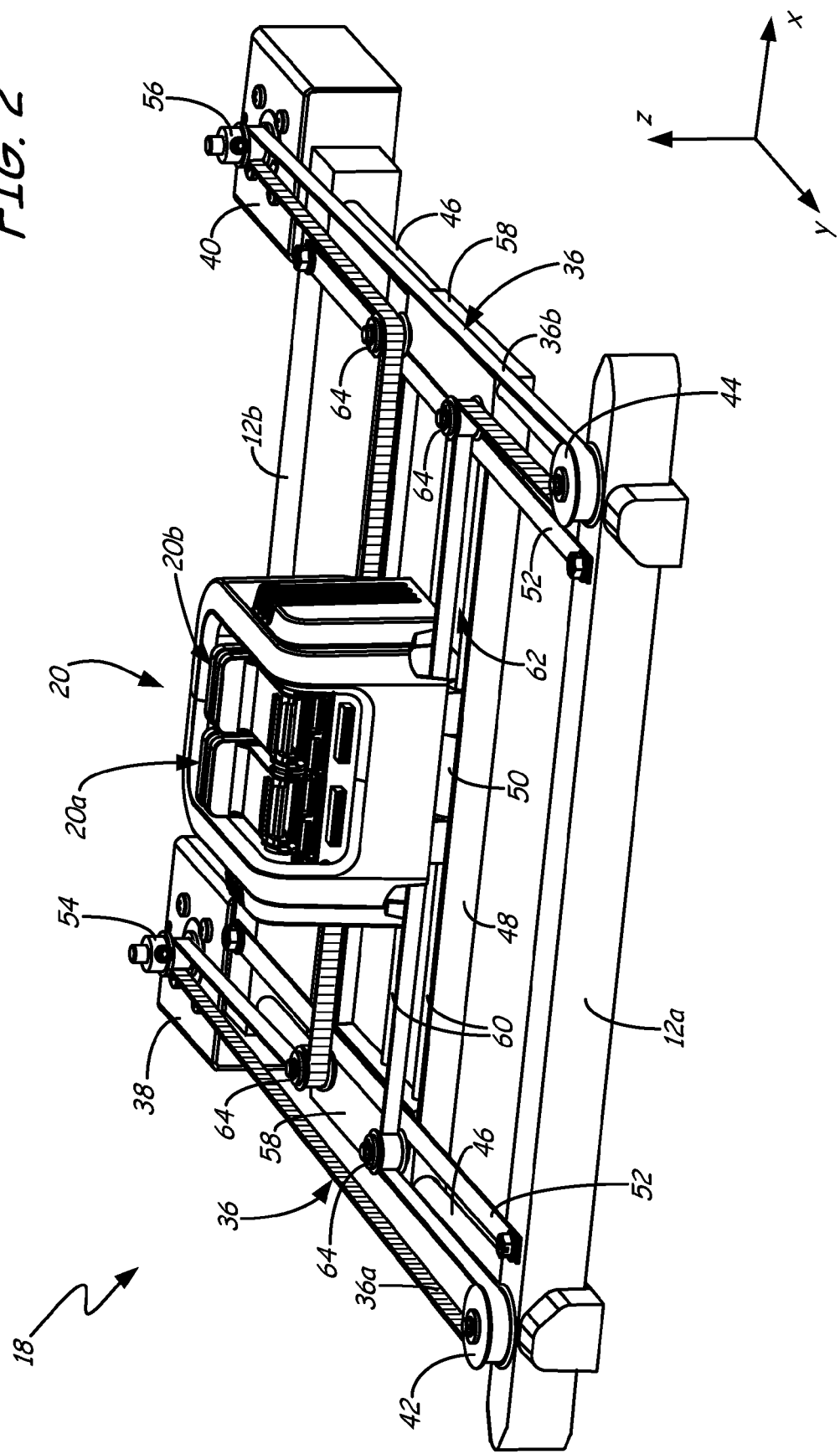
FIG. 2 is an expanded top perspective view of the gantry assembly.

As discussed above, gantry assembly 18 is configured to retain and move print head assembly 20 in the x-y plane. As shown in FIG. 2, in which thermal baffles 28 and 30 are omitted for ease of discussion, gantry assembly 18 includes drive belt 36, motors 38 and 40, fixed pulleys 42 and 44, a pair of y-axis bearing shafts 46, carriage 48, tool-head mount 50, and retention members 52.

Drive belt 36 is a single belt derived from one or more polymeric and/or metallic materials that allow drive belt 36 to bend around pulleys (e.g., fixed pulleys 42 and 44). In one embodiment, drive belt 36 is substantially non-elastic, which prevents drive belt 36 from stretching. This is beneficial for accurately positioning print head assembly 20 at desired coordinates in the x-y plane. The terms "about" and "substantially" are used herein with respect to measurable values and ranges due to expected variations known to those skilled in the art (e.g., limitations and variabilities in measurements).

As shown, drive belt 36 includes major surfaces 36a and 36b, where major surface 36a includes teeth or other forms of surface texture, and major surface 36b is smooth. In an alternative embodiment, major surface 36b may also include teeth or other forms of surface texture.

Motors 38 and 40 are drive motors operably retained by housing frame 12 at the rear portion of system 10. Directional terms such as front, rear, left, and right, are used for ease of discussion to identify relative directions and locations, and are not intended to limit the use of gantry assembly 18 to any particular orientation. For example, the front and rear orientations of system 10 may be inverted for conformance with the directional orientations of the additive manufacturing system disclosed in Swanson et al., U.S. Pat. No. 8,419,996.

Motors 38 and 40 respectively include drive shafts 54 and 56 engaged with major surface 36a of drive belt 36. Drive shafts 54 and 56 may include reciprocating teeth or textures to mate with the teeth (or other forms of surface texture) of major surface 36a, thereby allowing accurate movement of drive belt 36 with the rotations of drive shafts 54 and 56, as discussed below.

Fixed pulleys 42 and 44 are rotatable components that are rotatably mounted to front retention beam 12a, desirably at locations that are offset from motors 38 and 44 and from each other to define a perimeter in the x-y plane within which print head assembly 20 may travel. Fixed pulleys 42 and 44 also engage with major surface 36a of drive belt 36, and may also include reciprocating teeth or textures to mate with the teeth (or other forms of surface texture) of major surface 36a. During operation of system 10, drive shafts 54 and 56 and fixed pulleys 42 and 44 are desirably retained by housing frame 12 at fixed locations to maintain tension on drive belt 36. In particular, in the shown embodiment, fixed pulley 42 is rotatably mounted to front retention beam 12a at a location that is generally offset along the y-axis from motor 38 and drive shaft 54. Correspondingly, fixed pulley 44 is rotatably mounted to front retention beam 12a at a location that is generally offset along the y-axis from motor 40 and drive shaft 56. Fixed pulleys 42 and 44 are likewise offset along the x-axis from each other.

Y-axis bearing shafts 46 are a pair of linear bearing shafts extending along the x-axis, with first ends mounted to front retention beam 12a and second ends mounted to rear retention beam 12b. While illustrated with a pair of y-axis guide rail 46, gantry assembly 18 may alternatively include three or more y-axis bearing shafts 46, depending on the desired mounting arrangements for carriage 48.

Carriage 48 is a plate member or other suitable component that is slidably mounted to y-axis bearing shafts 46, and is configured to support tool-head mount 50. Carriage 48 includes a pair of bearing sleeves 58, a pair of x-axis bearing shafts 60 (best shown in FIG. 3), slot 62 (best shown in FIG. 3), and four pulleys 64. Bearing sleeves 58 are coupled to, or integrally formed with carriage 48 at the lateral ends of carriage 48 offset along the x-axis. Bearing sleeves 58 each include one or more bearings (not shown in FIG. 2) slidably engaged with y-axis bearing shafts 46, allowing carriage 48 to slide along the y-axis by the rotation of drive belt 36, as discussed below.

X-axis bearing shafts 60 are a pair of linear bearing shafts extending along the x-axis, substantially orthogonal to y-axis bearing shafts 46, and have opposing ends mounted to the laterally offset bearing sleeves 58. As such, x-axis bearing shafts 60 are retained by carriage 48 and move along the y-axis with the movement of carriage 48. While illustrated with a pair of x-axis guide rail 60, gantry assembly 18 may alternatively include three or more x-axis bearing shafts 60, depending on the desired mounting arrangements for tool-head mount 50.

In the shown embodiment, slot 62 is an elongated slot extending along the x-axis, which provides a suitable location for print heads 20a and 20b to extend through to deposit the part and support materials to build 3D part 24 and support structure 26, while also allowing print head assembly 20 to slide along x-axis bearing shafts 60. This arrangement allows the remaining portion of carriage 48 to function as a moveable ceiling component for build chamber 14, which functions as a thermal barrier between build chamber 14 and the electronic components of print head assembly 20, along with thermal baffles 28 and 30.

Pulleys 64 are rotatable pulleys engaged with major surface 36b of drive belt 36. Pulleys 64 are rotatably mounted to carriage 48 at fixed locations along bearing sleeves 58, with a pair of pulleys 64 mounted to each bearing sleeve 58. As discussed below, pulleys 64 assist drive belt 36 in pulling tool-head mount 50 and print head assembly 20 along x-axis bearing shafts 60 based on the rotational directions and rotational rates of drive shafts 54 and 56.

Tool-head mount 50 is a second carriage configured to receive and retain print head assembly 20 (or any other suitable tool head) during operation of system 10, as shown. Tool-head mount 50 is slidably retained by x-axis bearing shafts 60 with a plurality of bearings (not shown), and is secured to a segment of drive belt 36. For example, opposing ends of drive belt 36 may be secured to tool-head mount 50 (and/or a portion of print head assembly 20), and tightened to maintain tension on drive belt 36. This arrangement allows the rotation of drive belt 36 to pull tool-head mount 50 and print head assembly 20 along the x-axis relative to carriage 48, as discussed below.

Retention members 52 are a pair of braces extending along the y-axis and having opposing ends secured respectively to front retention beam 12a and rear retention beam 12b. Retention members 52 assist in retaining carriage 48 at its mounted location.

Figure 3:
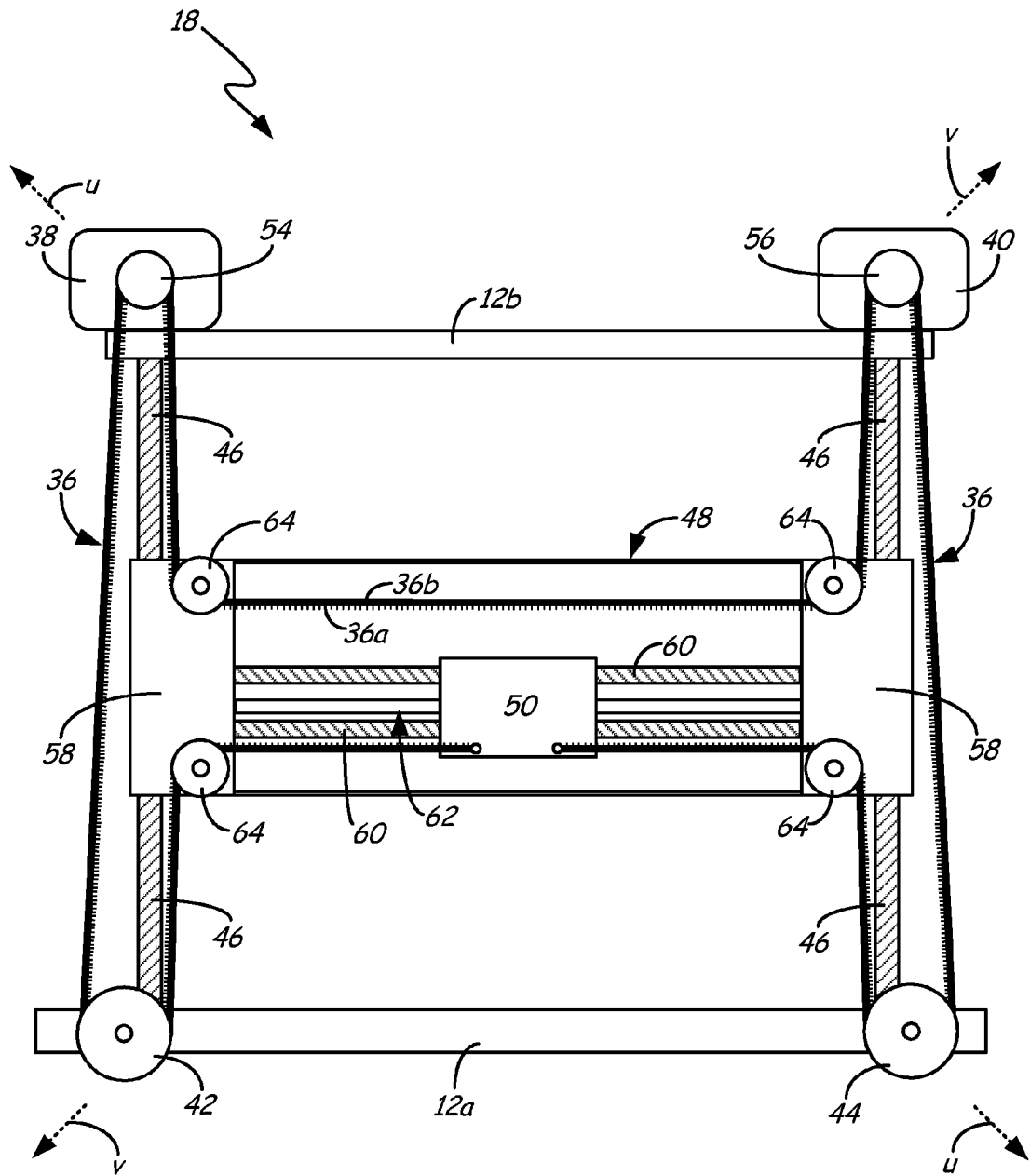
FIG. 3 is a top schematic view of the gantry assembly.

FIG. 3 is a top schematic view of gantry assembly 18, which illustrates the operation of drive belt 36 to move tool-head mount 50 (and any retained tool head, such as print head assembly 20) in the x-y plane based on the independent operations of motors 38 and 40. Retention members 52 are omitted from the view shown in FIG. 3 for ease of discussion, and y-axis bearing shafts 46 and x-axis bearing shafts 60 are illustrated with sectional hatching for ease of visibility.

Drive belt 36 is wrapped under tension around fixed pulleys 42 and 44, drive shafts 54 and 56, and pulleys 64 of carriage 48. As discussed below, controller 32 may operate motors 38 and 40 in an independent manner to move carriage 48 (retaining tool-head mount 50) in directions along the y-axis relative to build chamber 14 and platen 16, and to move tool-head mount 50 (retaining print head assembly 20) in directions along the x-axis relative to carriage 48. This allows tool-head mount 50 (and print head assembly 20) to be moved to any coordinate location in the x-y plane above build chamber 14 and platen 16.

While carriage 48 is slidable along the y-axis and tool-head mount 50 is slidable along the x-axis, it is convenient to refer to the movement of tool-head mount 50 and print head assembly 20 in the x-y plane based on axes that are rotatably offset from the x-axis and the y-axis by 45 degrees in the x-y plane. As shown in FIG. 3, these rotatably offset axes are herein referred to as the u-axis and the v-axis.

Figure 4:
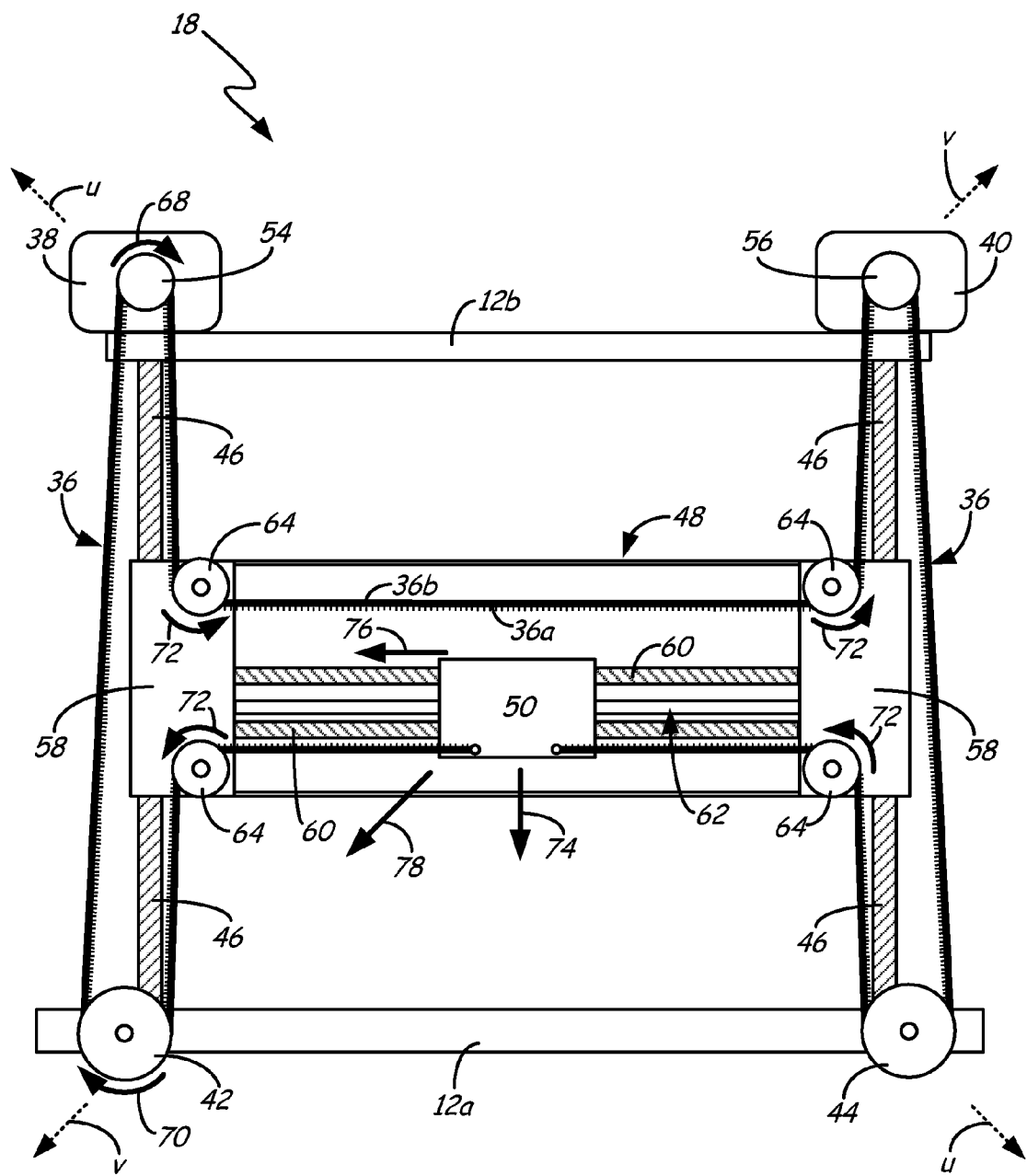
FIG. 4 is a top schematic view of the gantry assembly being operated in a first manner to move a tool-head mount in a front left direction along a v-axis.

FIGS. 4-11 illustrate the movement of carriage 48 and tool-head mount 50 based on the independent operations of motors 38 and 40, where controller 32 operates one of motors 38 and 40 individually, and keeps the other of motors 38 and 40 idle. For example, as shown in FIG. 4, controller 32 may direct motor 38 to rotate drive shaft 54 in a clockwise direction of arrow 68, while directing motor 40 to keep drive shaft 56 stationary. This results in drive belt 36 rotating around fixed pulley 42 and pulleys 64, as illustrated by arrows 70 and 72, respectively. In this example, fixed pulley 44 and drive shaft 56 of motor 40 remain substantially stationary.

The rotation of drive belt 36 in this manner pulls carriage 48 along y-axis bearing shafts 46 in the direction of arrow 74, and also simultaneously pulls tool-head mount 50 along x-axis bearing shafts 60 in the direction of arrow 76. This effectively moves tool-head mount 50 along the v-axis in the direction of arrow 78. Additionally, the movement of carriage 48 in the direction of arrow 74 compresses thermal baffle 28 (shown in FIG. 1) and expands thermal baffle 30 (shown in FIG. 1).

Figure 5:
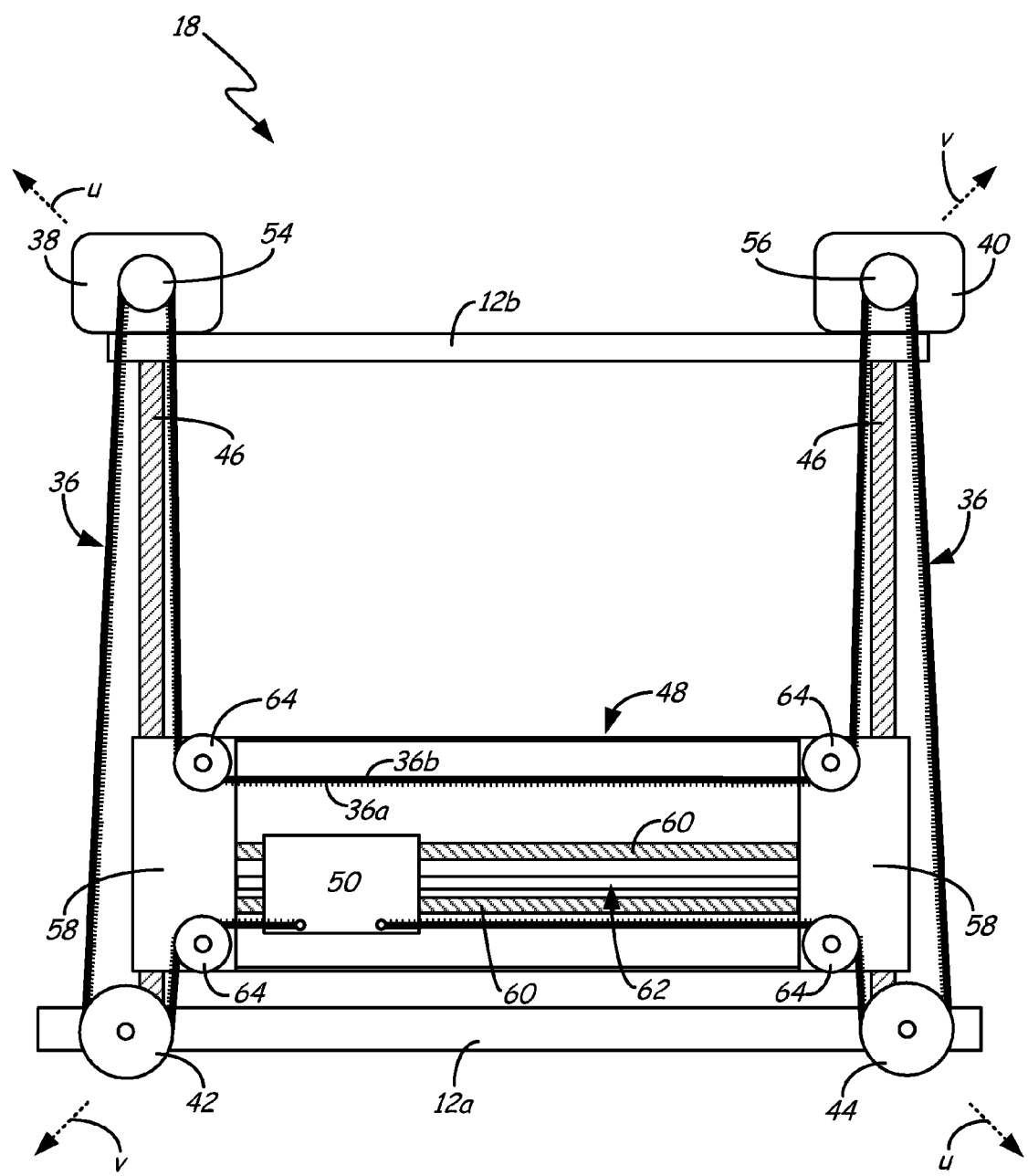
FIG. 5 is a top schematic view of the gantry assembly after the tool-head mount is moved in the front left direction depicted in FIG. 4.

As shown in FIG. 5, this repositions tool-head mount 50 (and the retained print head assembly 20) in the x-y plane towards the front left corner of build chamber 14. Front retention beam 12a and thermal baffle 28 may collectively function as a front hard stop for carriage 48 to restrict its range of movement along the y-axis in the direction of arrow 74 (shown in FIG. 4). Similarly, the left bearing sleeve 58 may function as a left-side hard stop for tool-head mount 50 restrict its range of movement along the x-axis in the direction of arrow 76 (shown in FIG. 4).

Alternatively, as shown in FIG. 6, controller 32 may direct motor 38 to rotate drive shaft 54 in a counter-clockwise direction of arrow 80, while directing motor 40 to keep drive shaft 56 stationary. This results in drive belt 36 rotating around fixed pulley 42 and pulleys 64, as illustrated by arrows 82 and 84, respectively. In this example, fixed pulley 44 and drive shaft 56 of motor 40 remain substantially stationary.

The rotation of drive belt 36 in this manner pulls carriage 48 along y-axis bearing shafts 46 in the direction of arrow 86 (opposite of arrow 74, shown in FIG. 4), and also simultaneously pulls tool-head mount 50 along x-axis bearing shafts 60 in the direction of arrow 88 (opposite of arrow 76, shown in FIG. 4). This effectively moves tool-head mount 50 along the v-axis in the direction of arrow 90. Additionally, the movement of carriage 48 in the direction of arrow 86 compresses thermal baffle 30 (shown in FIG. 1) and expands thermal baffle 28 (shown in FIG. 1).

Figure 7:
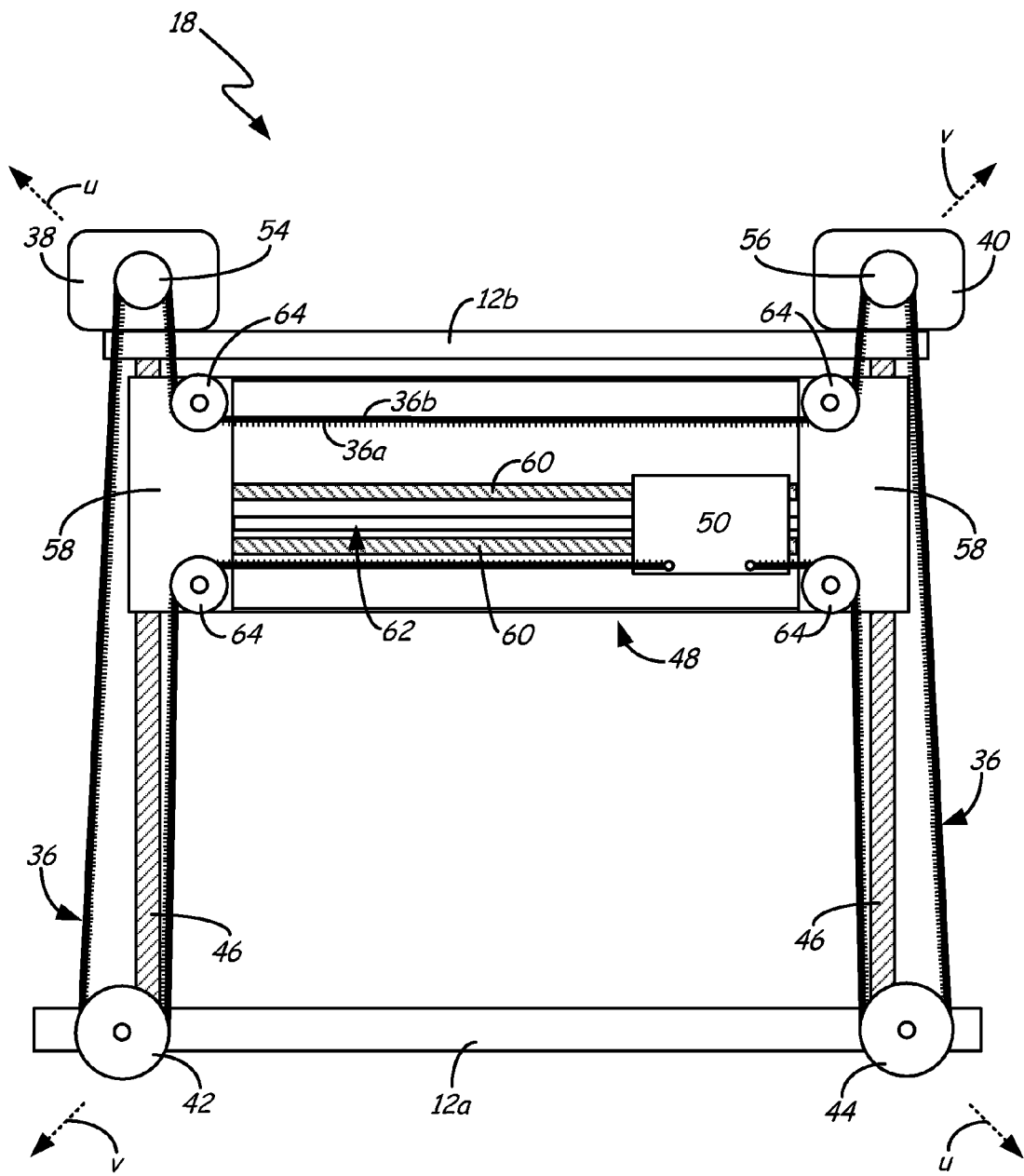
FIG. 7 is a top schematic view of the gantry assembly after the tool-head mount is moved in the rear right direction depicted in FIG. 6.

As shown in FIG. 7, this repositions tool-head mount 50 (and the retained print head assembly 20) in the x-y plane towards the rear right corner of build chamber 14. Rear retention beam 12b and thermal baffle 30 may collectively function as a rear hard stop for carriage 48 to restrict its range of movement along the y-axis in the direction of arrow 86 (shown in FIG. 6). Similarly, the right bearing sleeve 58 may function as a right-side hard stop for tool-head mount 50 restrict its range of movement along the x-axis in the direction of arrow 88 (shown in FIG. 6).

Figure 8:
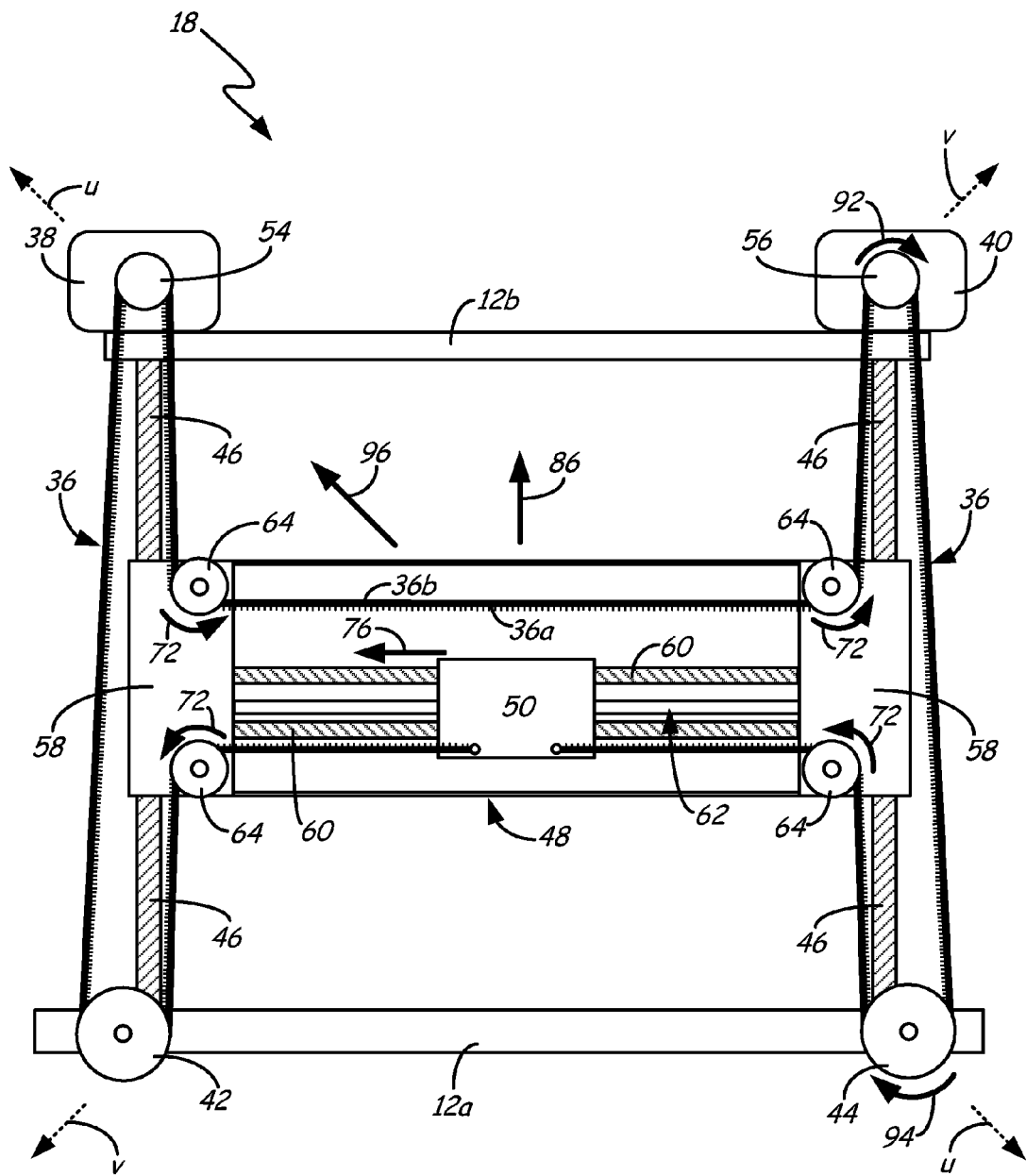
FIG. 8 is a top schematic view of the gantry assembly being operated in a third manner to move the tool-head mount in a rear left direction along a u-axis.

As shown in FIG. 8, controller 32 may alternatively direct motor 40 to rotate drive shaft 56 in a clockwise direction of arrow 92, while directing motor 38 to keep drive shaft 54 stationary. This results in drive belt 36 rotating around fixed pulley 44 and pulleys 64, as illustrated by arrows 94 and 72, respectively. In this example, fixed pulley 42 and drive shaft 54 of motor 38 remain substantially stationary.

Figure 9:
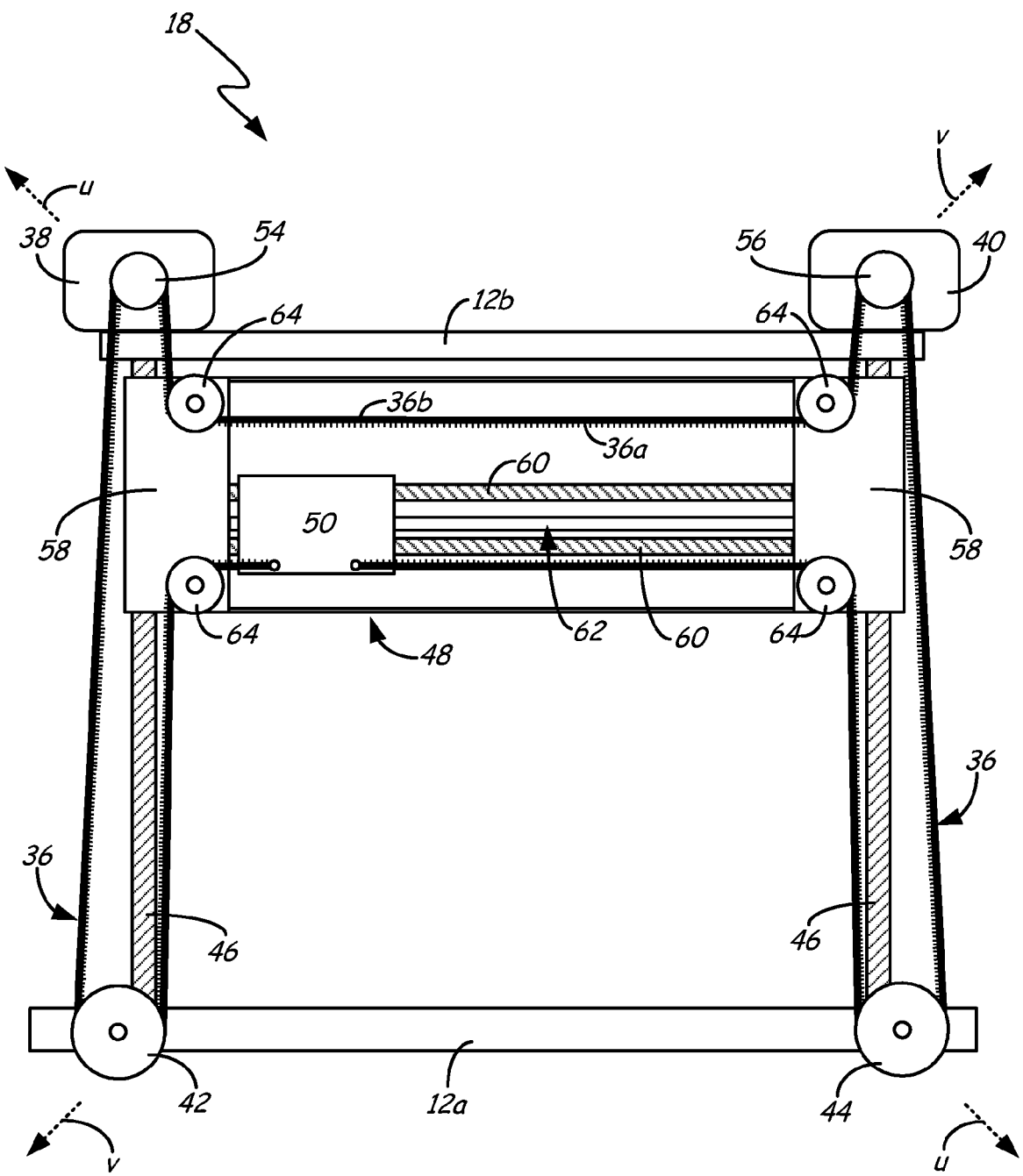
FIG. 9 is a top schematic view of the gantry assembly after the tool-head mount is moved in the rear left direction depicted in FIG. 8.

The rotation of drive belt 36 in this manner pulls carriage 48 along y-axis bearing shafts 46 in the direction of arrow 86, and also simultaneously pulls tool-head mount 50 along x-axis bearing shafts 60 in the direction of arrow 76. This effectively moves tool-head mount 50 along the u-axis in the direction of arrow 96. As shown in FIG. 9, this repositions tool-head mount 50 (and the retained print head assembly 20) in the x-y plane towards the rear left corner of build chamber 14.

Figure 10:
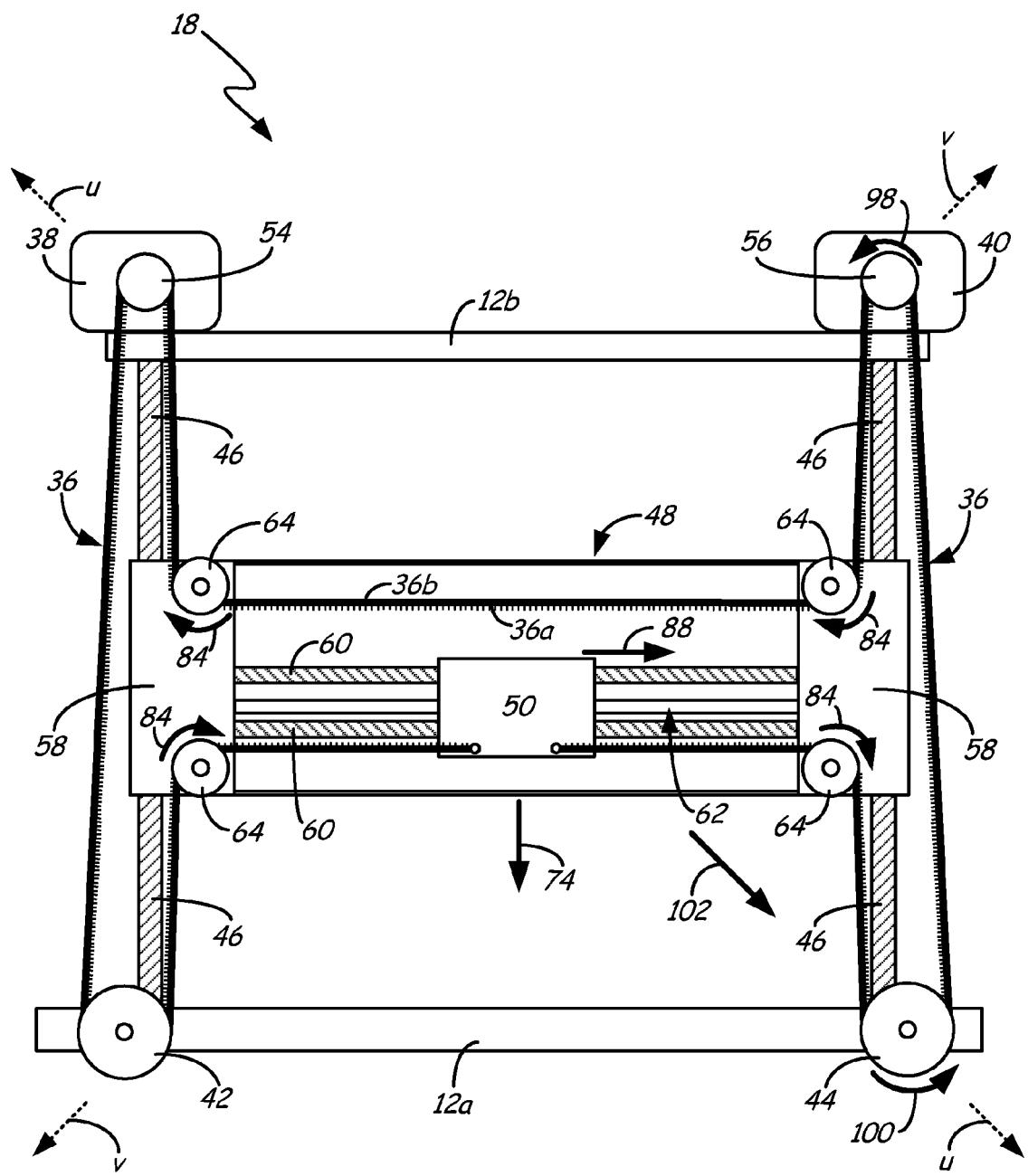
FIG. 10 is a top schematic view of the gantry assembly being operated in a fourth manner to move the tool-head mount in a front right direction along the u-axis.

Alternatively, as shown in FIG. 10, controller 32 may direct motor 40 to rotate drive shaft 56 in a counter-clockwise direction of arrow 98, while directing motor 38 to keep drive shaft 54 stationary. This results in drive belt 36 rotating around fixed pulley 44 and pulleys 64, as illustrated by arrows 100 and 84, respectively. In this example, fixed pulley 44 and drive shaft 54 of motor 38 remain substantially stationary.

Figure 11:
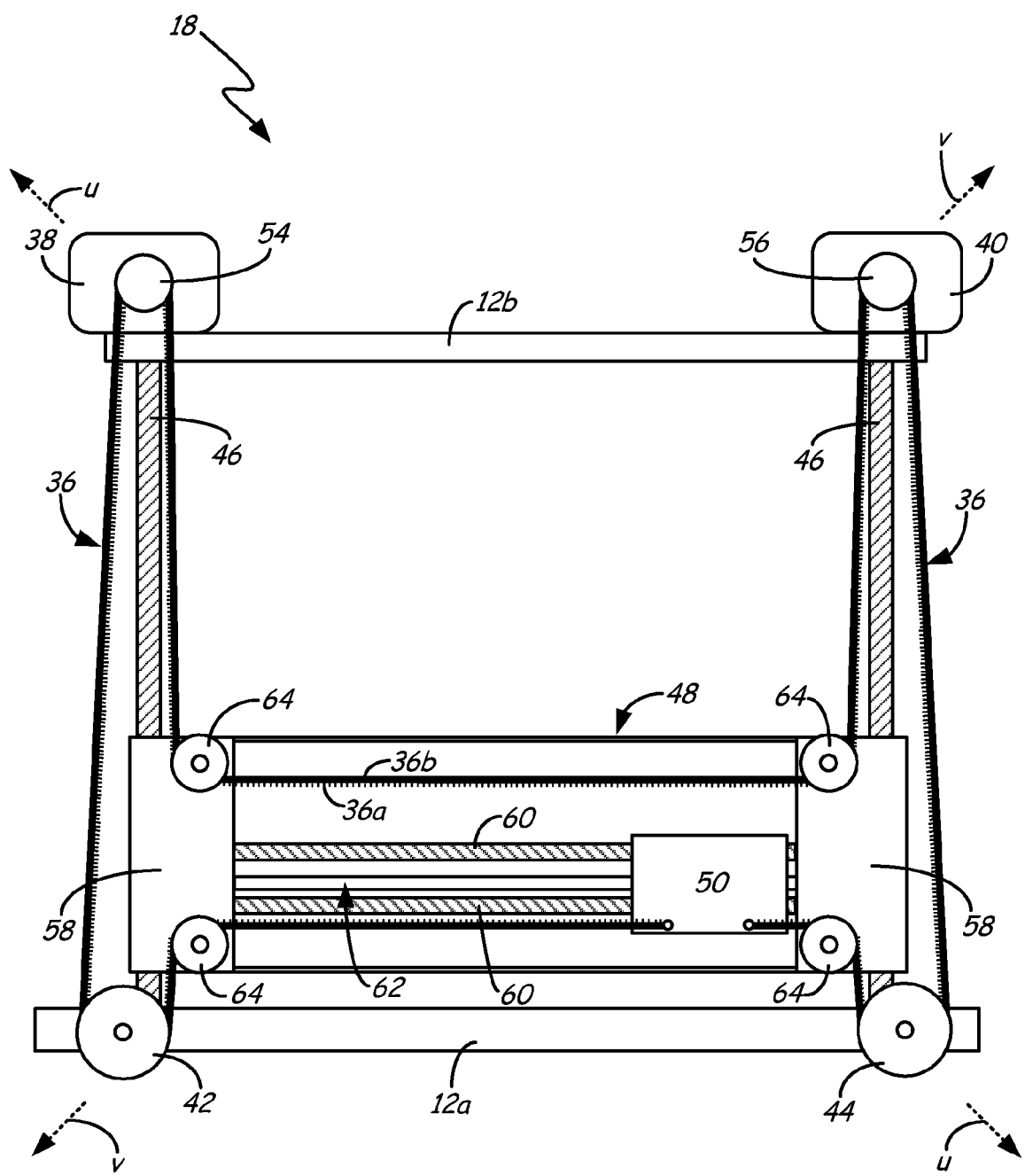
FIG. 11 is a top schematic view of the gantry assembly after the tool-head mount is moved in the front right direction depicted in FIG. 10.

The rotation of drive belt 36 in this manner pulls carriage 48 along y-axis bearing shafts 46 in the direction of arrow 74 (opposite of arrow 86, shown in FIG. 8), and also simultaneously pulls tool-head mount 50 along x-axis bearing shafts 60 in the direction of arrow 88 (opposite of arrow 76, shown in FIG. 8). This effectively moves tool-head mount along the u-axis in the direction of arrow 102. As shown in FIG. 11, this repositions tool-head mount 50 (and the retained print head assembly 20) in the x-y plane towards the front right corner of build chamber 14.

Accordingly, controller 32 may operate motors 38 and 40 individually to selectively move tool-head mount 50 in directions along the u-axis and the v-axis. Additionally, controller 32 may also direct motors 38 and 40 to simultaneously rotate drive shafts 54 and 56 at substantially the same rotational rates, in either the opposing rotational directions or the same rotational directions. As shown in FIGS. 12-15, controller 32 may direct motors 38 and 40 to simultaneously rotate drive shafts 54 and 56 in opposing rotational directions at substantially the same rotational rates to move carriage 48 (retaining tool-head mount 50) in directions along the y-axis.

Figure 12:
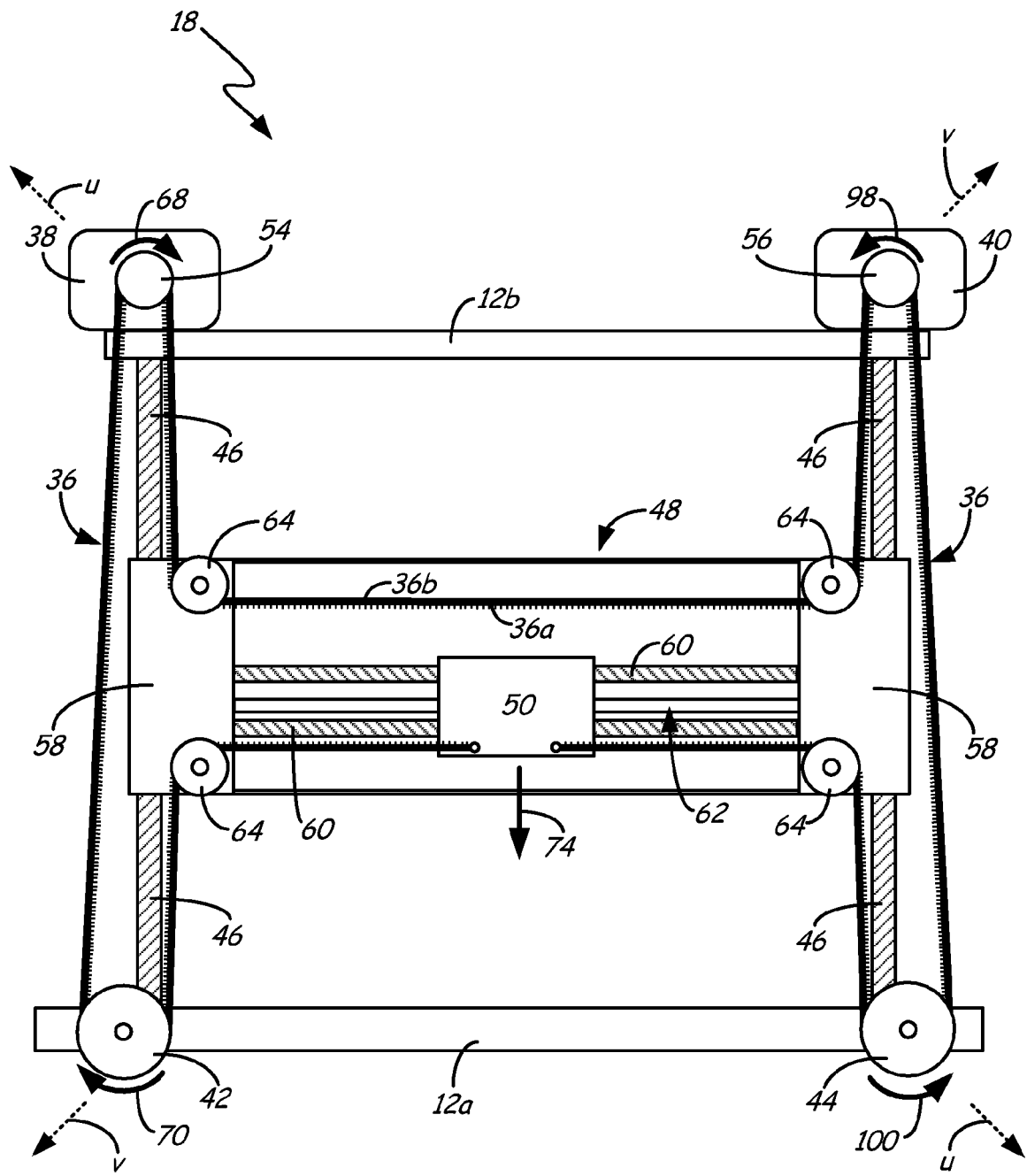
FIG. 12 is a top schematic view of the gantry assembly being operated in a fifth manner to move the tool-head mount in a front center direction along a y-axis.

For example, as shown in FIG. 12, controller 32 may direct motor 38 to rotate drive shaft 54 in the clockwise direction of arrow 68, and simultaneously direct motor 40 to rotate drive shaft 56 in the counter-clockwise direction of arrow 98, at substantially the same rotational rates. This results in drive belt 36 rotating around fixed pulleys 42 and 44, as illustrated by arrows 70 and 100, respectively. In this example, pulleys 64 remain substantially stationary.

Figure 13:
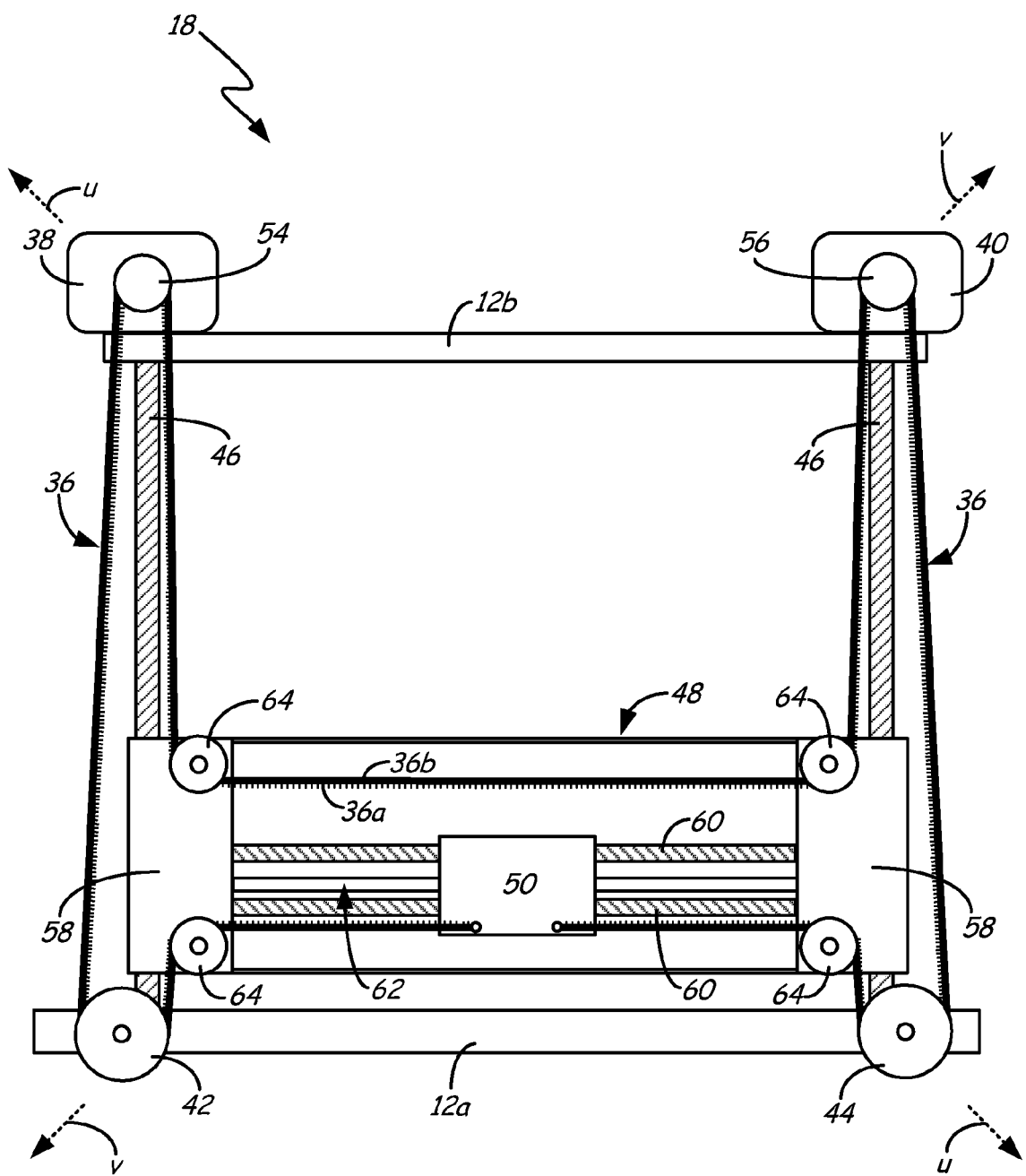
FIG. 13 is a top schematic view of the gantry assembly after the tool-head mount is moved in the front center direction depicted in FIG. 12.

The rotation of drive belt 36 in this manner pulls carriage 48 along y-axis bearing shafts 46 in the direction of arrow 74. However, tool-head mount 50 remains substantially stationary relative to carriage 48, and does not move along the x-axis. As shown in FIG. 13, this repositions tool-head mount 50 (and the retained print head assembly 20) in the x-y plane towards the front center portion of build chamber 14.

Figure 14:
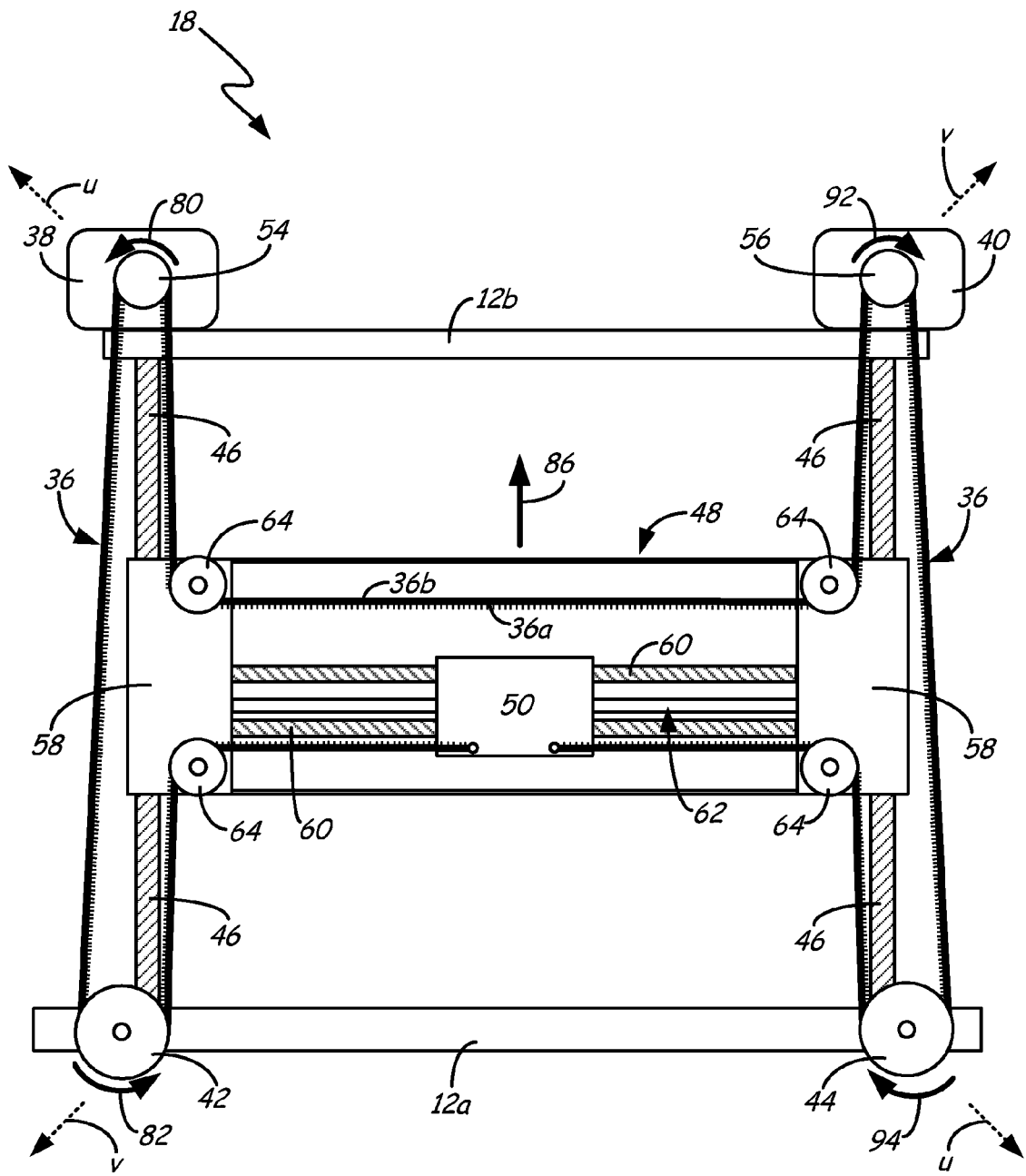
FIG. 14 is a top schematic view of the gantry assembly being operated in a sixth manner to move the tool-head mount in a rear center direction along the y-axis.

Alternatively, as shown in FIG. 14, controller 32 may direct motor 38 to rotate drive shaft 54 in the counter-clockwise direction of arrow 80, and simultaneously direct motor 40 to rotate drive shaft 56 in the counter-clockwise direction of arrow 92, at substantially the same rotational rates. This results in drive belt 36 rotating around fixed pulleys 42 and 44, as illustrated by arrows 82 and 94, respectively. In this example, pulleys 64 remain substantially stationary.

Figure 15:
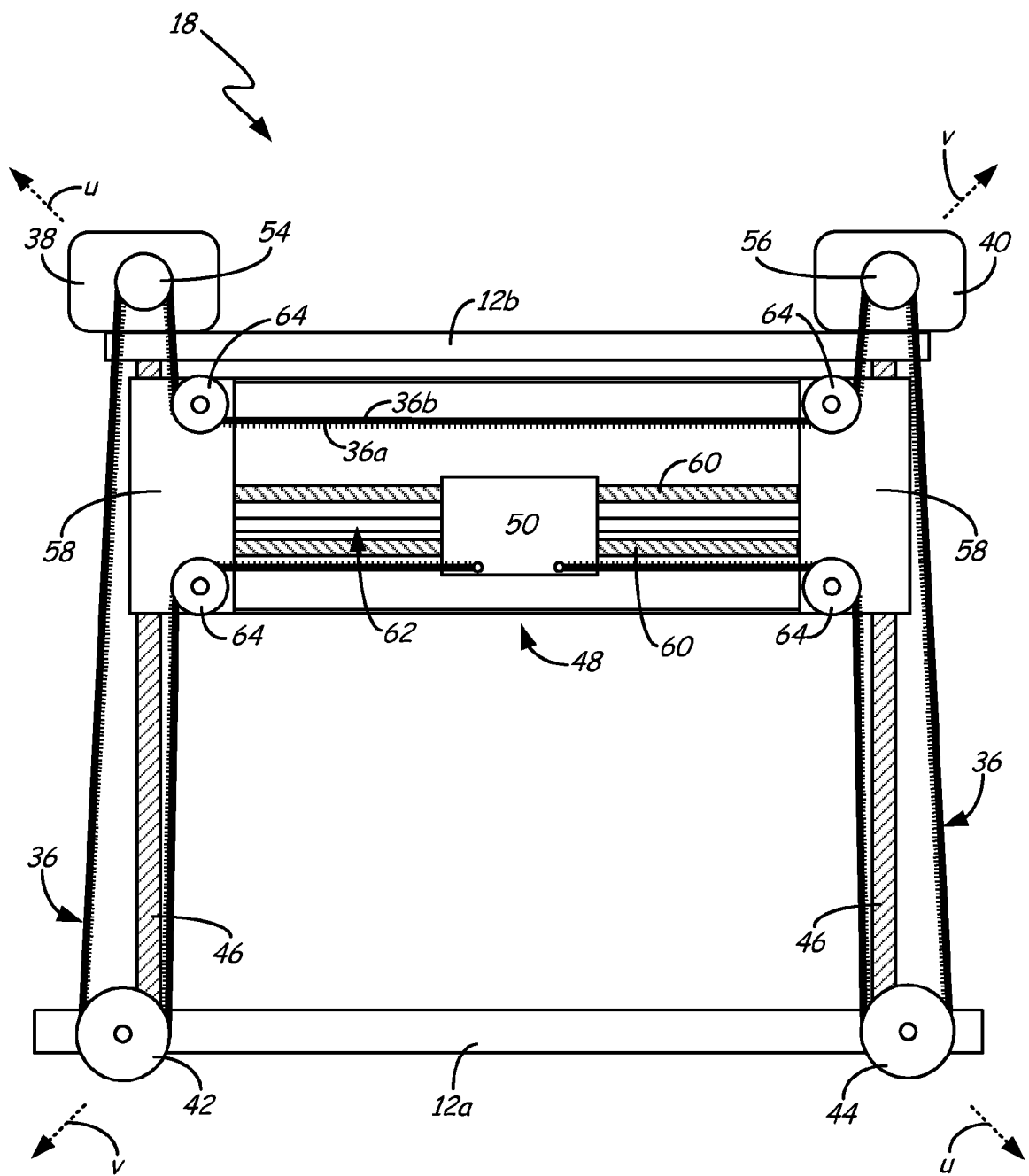
FIG. 15 is a top schematic view of the gantry assembly after the tool-head mount is moved in the rear center direction depicted in FIG. 14.

The rotation of drive belt 36 in this manner pulls carriage 48 along y-axis bearing shafts 46 in the direction of arrow 86, and tool-head mount 50 remains substantially stationary relative to carriage 48. As shown in FIG. 15, this repositions tool-head mount 50 (and the retained print head assembly 20) in the x-y plane towards the rear center portion of build chamber 14.

Figure 16:
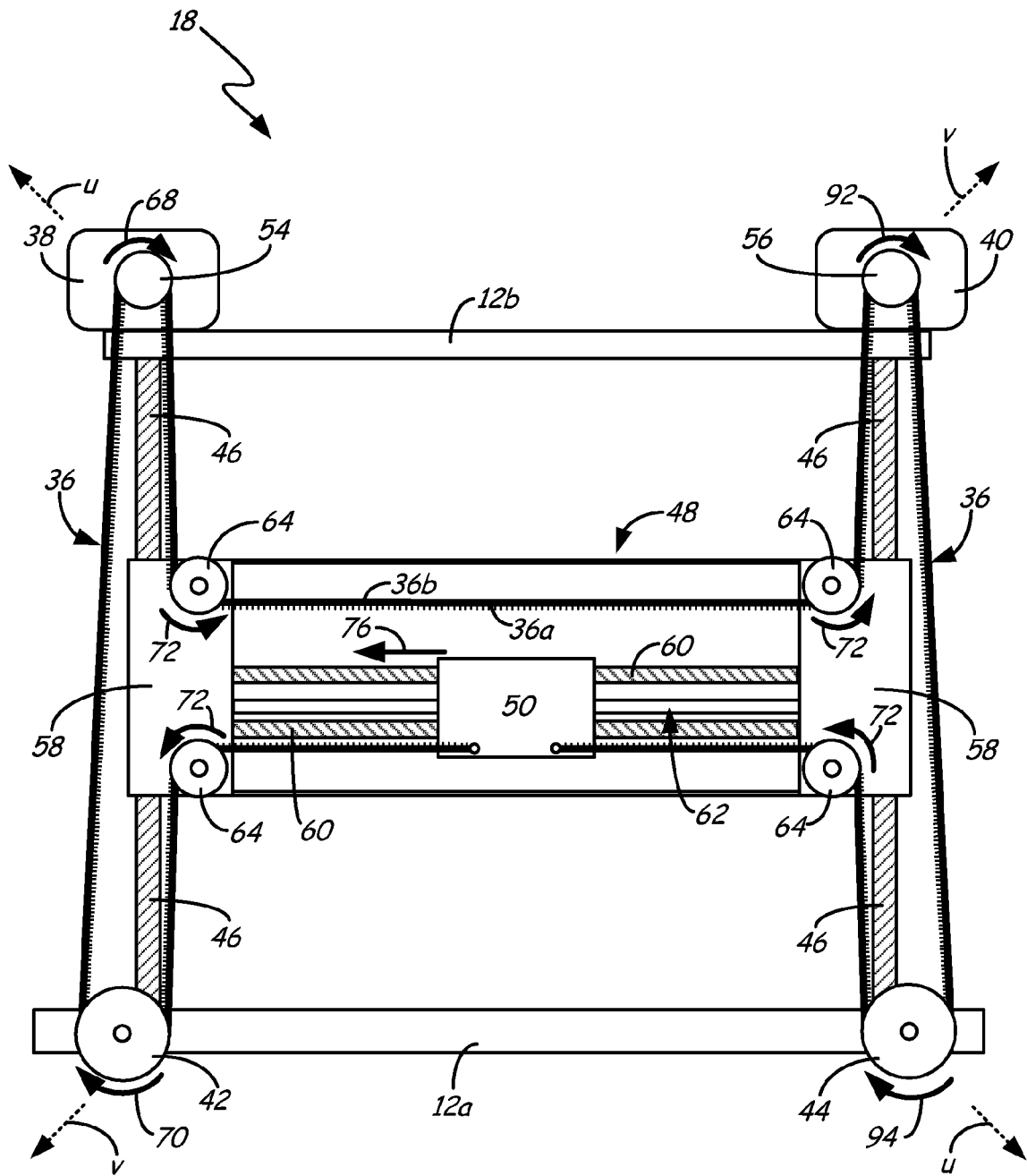
FIG. 16 is a top schematic view of the gantry assembly being operated in a seventh manner to move the tool-head mount in a left center direction along an x-axis.

As shown in FIGS. 16-19, controller 32 may also direct motors 38 and 40 to simultaneously rotate drive shafts 54 and 56 in the same rotational directions at substantially the same rotational rates to move tool-head mount 50 in directions along the x-axis relative to carriage 48. For example, as shown in FIG. 16, controller 32 may direct motor 38 to rotate drive shaft 54 in the clockwise direction of arrow 68, and simultaneously direct motor 40 to rotate drive shaft 56 in the clockwise direction of arrow 92, at substantially the same rotational rates. This results in drive belt 36 rotating around fixed pulleys 42 and 44, as illustrated by arrows 70 and 94, respectively, and around pulleys 64, as illustrated by arrows 72.

Figure 17:
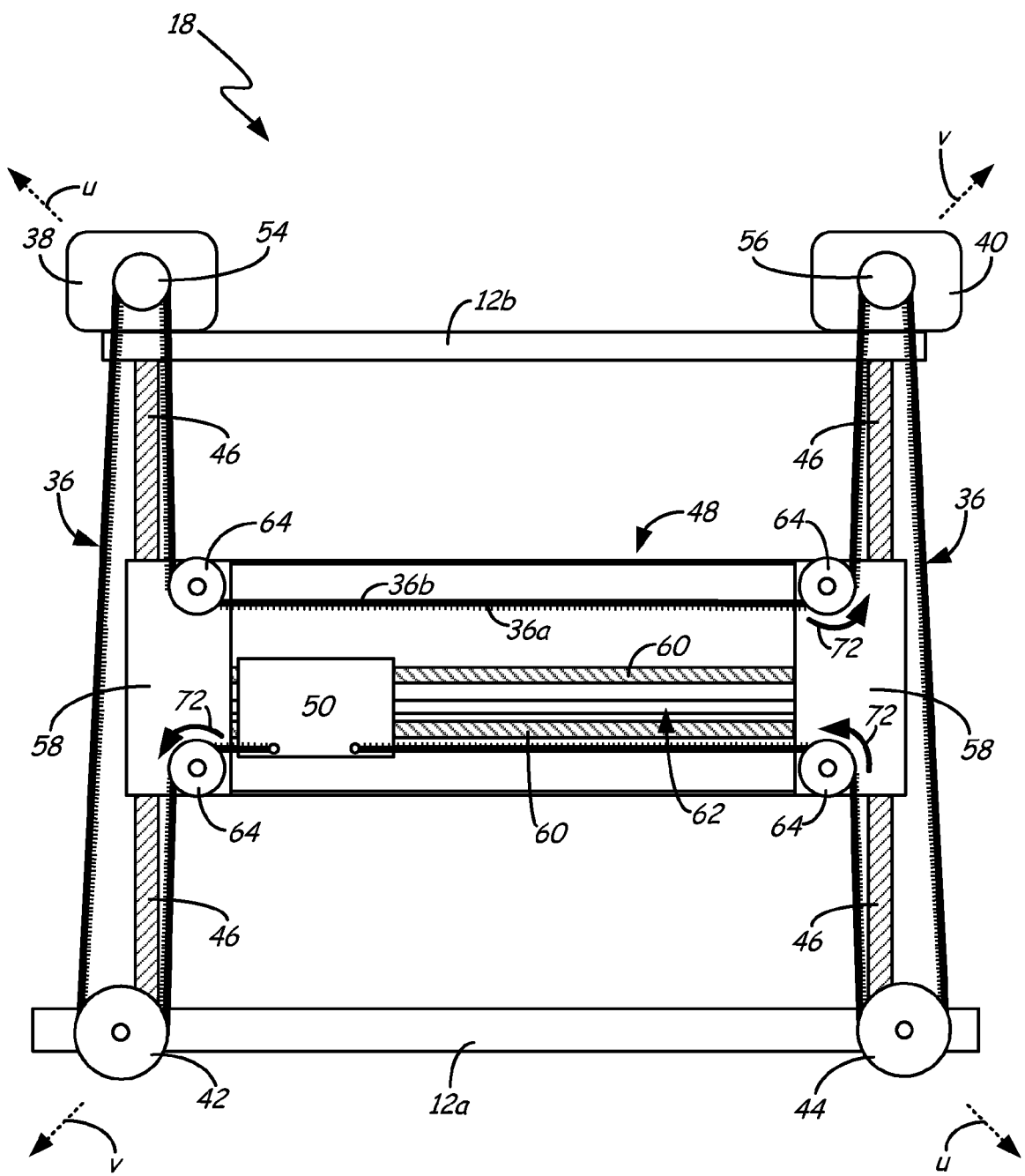
FIG. 17 is a top schematic view of the gantry assembly after the tool-head mount is moved in the left center direction depicted in FIG. 16.

The rotation of drive belt 36 in this manner pulls tool-head mount 50 along x-axis bearing shafts 60 in the direction of arrow 76. However, carriage 48 remains substantially stationary along the y-axis. As shown in FIG. 17, this repositions tool-head mount 50 (and the retained print head assembly 20) in the x-y plane towards the center left portion of build chamber 14.

Figure 18:
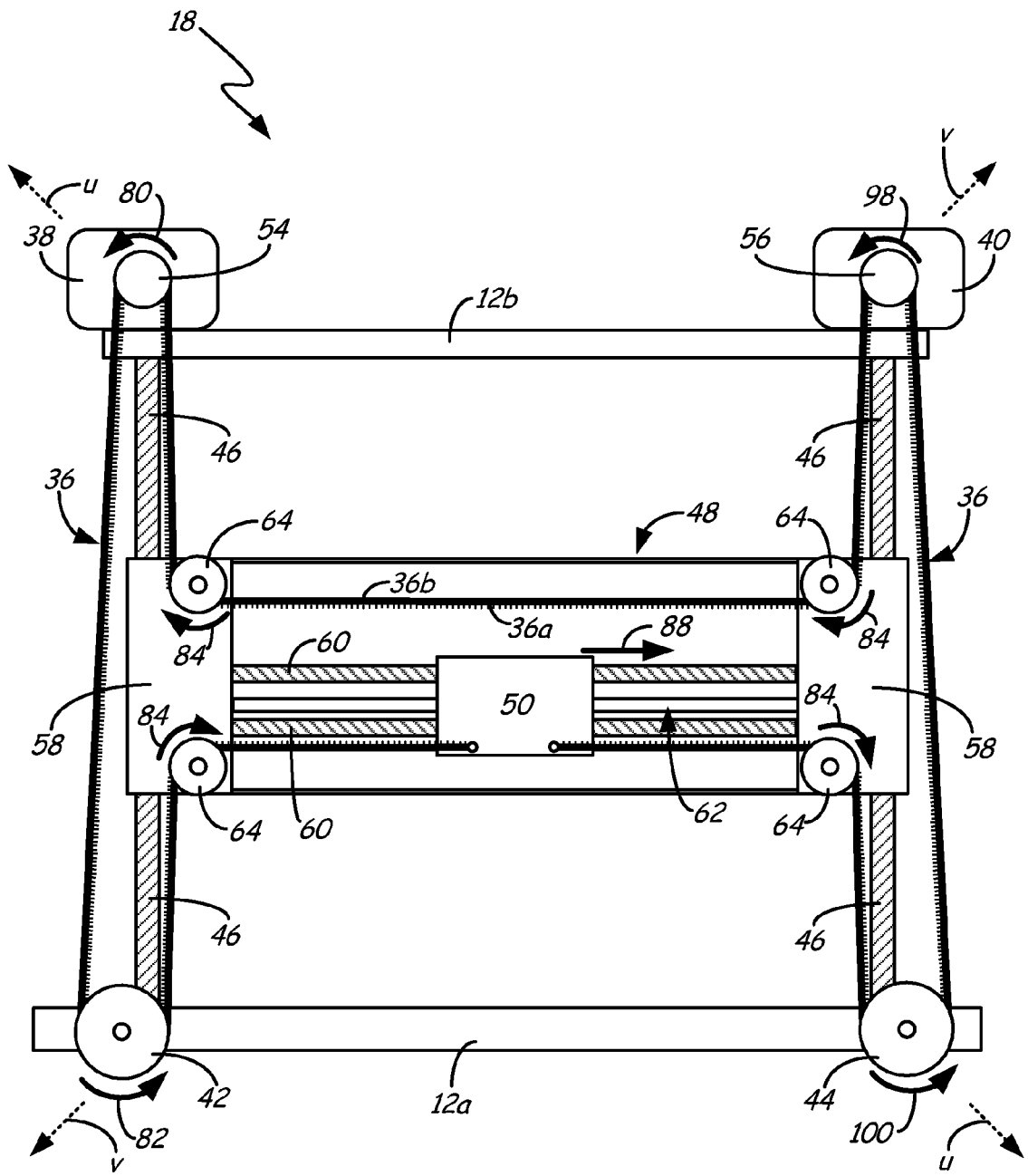
FIG. 18 is a top schematic view of the gantry assembly being operated in an eighth manner to move the tool-head mount in a right center direction along the x-axis.

Alternatively, as shown in FIG. 18, controller 32 may direct motor 38 to rotate drive shaft 54 in the counter-clockwise direction of arrow 80, and simultaneously direct motor 40 to rotate drive shaft 56 in the counter-clockwise direction of arrow 98, at substantially the same rotational rates. This results in drive belt 36 rotating around fixed pulleys 42 and 44, as illustrated by arrows 82 and 100, respectively, and around pulleys 64, as illustrated by arrows 84.

Figure 19:
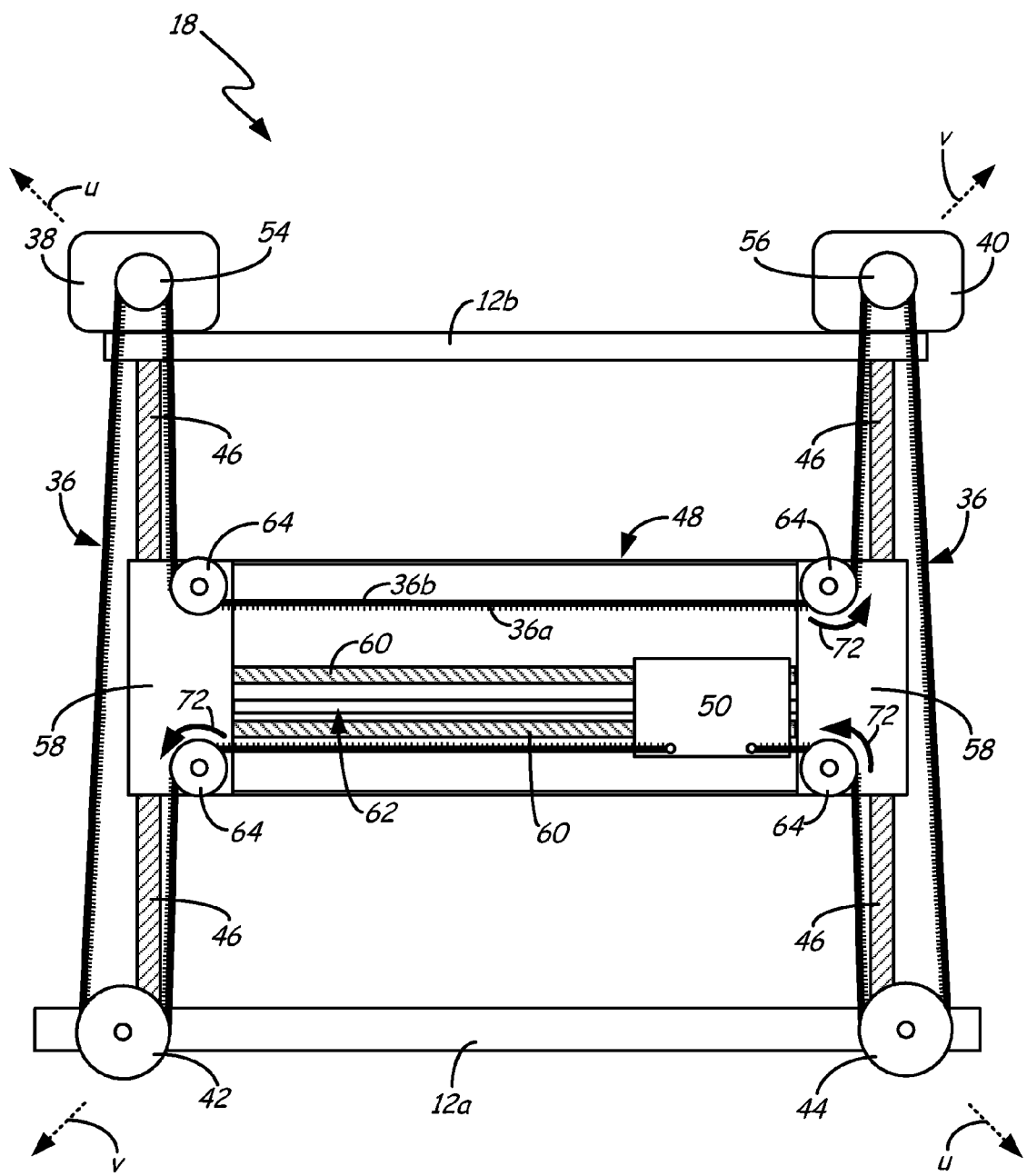
FIG. 19 is a top schematic view of the gantry assembly after the tool-head mount is moved in the right center direction depicted in FIG. 18.

The rotation of drive belt 36 in this manner pulls tool-head mount 50 along x-axis bearing shafts 60 in the direction of arrow 88. However, carriage 48 remains substantially stationary along the y-axis. As shown in FIG. 19, this repositions tool-head mount 50 (and the retained print head assembly 20) in the x-y plane towards the center right portion of build chamber 14.

The above-discussed examples illustrate how gantry assembly 18 may move print head assembly 20 (or any other suitable tool head) in a two-dimension plane (e.g., the x-y plane) based on the independent operations of motors 38 and 40. Print head assembly 20 may be moved in directions along the u-axis and the v-axis based on the individual operation of either motor 38 or motor 40, while the other of motors 38 and 40 remains idle. Alternatively, print head assembly 20 may be moved in directions along the x-axis and the y-axis based on simultaneous operations of motors 38 and 40 at substantially the same rotational rates, where the movements along the y-axis are attained when drive shafts 54 and 56 rotate in opposing rotational directions, and the movement along the x-axis are attained when bearing shafts 54 and 56 rotate in the same rotational directions.

Gantry assembly 18 may also move print head assembly 20 in any other desired direction in the x-y plane by combinations of the above-discussed operations of motors 38 and 40, where drive shafts 54 and 56 are operated at different rotational rates for drive shafts 54 and 56. Thus, motor 38 may rotate drive shaft 54 in either rotational direction between idle (i.e., drive shaft 54 is kept stationary) and a maximum rotational rate, and motor 40 may rotate drive shaft 56 in either rotational direction between idle (i.e., drive shaft 56 is kept stationary) and a maximum rotational rate, where the changes in the rotational directions and in the relative rotational rates may move tool-head mount 50 (and print head assembly 20) directly to any location in the x-y plane above platen 16.

System 10 is configured to built 3D parts and support structures (e.g., 3D part 24 and support structure 26, shown in FIG. 1) using high-resolution tool paths in the x-y plane, as well as with accurate increments along the z-axis. To attain the high resolutions in the x-y plane, print heads 20a and 20b (shown in FIGS. 1 and 2) are desirably positioned at accurate coordinates locations above platen 24.

In some embodiments, the bearings of bearing sleeves 58 and x-axis bearing shafts 46 may be separated by small gaps to allow small amounts of float to exist. This is beneficial for loosening the installation tolerances during assembly of system 10. The rotation of drive belt 36 applies torque to carriage 48 and tool-head mount 50 depending on the rotational direction of drive belt 36. The combination of the applied torque and the float between the bearings of bearing sleeves 58 and x-axis bearing shafts 46 may cause carriage 48 to pivot in the horizontal x-y plane relative to housing frame 12 when drive belt 36 rotates.

Figure 20:
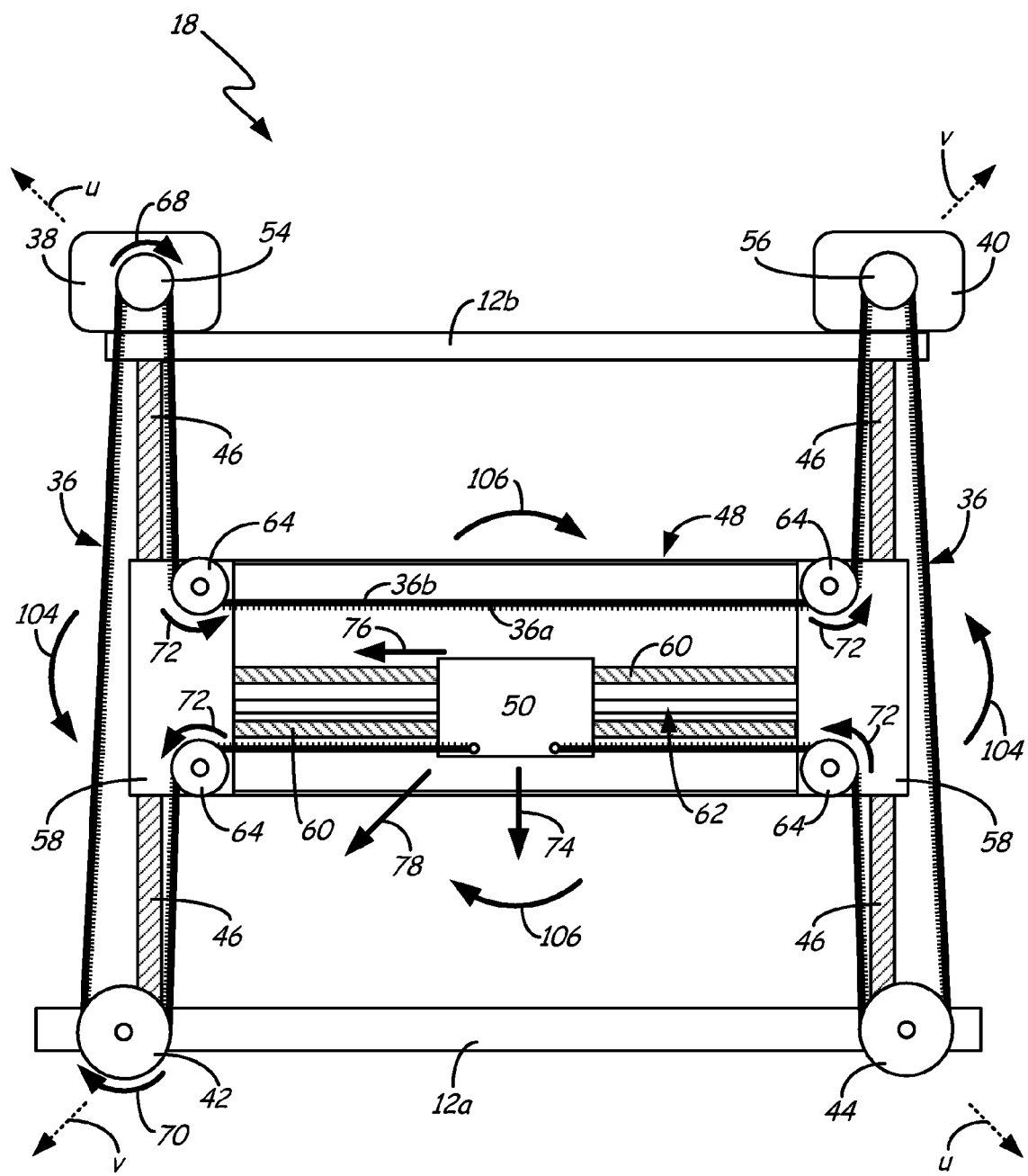
FIG. 20 is a top schematic view of the gantry assembly being operated in the first manner to move a tool-head mount in the front left direction along the v-axis, illustrating a horizontal pivoting of a carriage and the tool-head mount of the gantry assembly.

For example, as shown in FIG. 20, which corresponds to the above-discussed example shown in FIG. 4, the rotation of drive belt 36 may cause carriage 48 to pivot in a counterclockwise direction, as illustrated by arrows 104. Similarly, the bearings of bearing sleeves 58 and x-axis bearing shafts 46 may be separated by small gaps to allow small amounts of float to exist. The combination of the applied torque and the float between the bearings of bearing sleeves 58 and x-axis bearing shafts 46 may cause tool-head mount 50 to pivot in the horizontal x-y plane relative to carriage 48 when drive belt 36 rotates.

These pivotings of carriage 48 and tool-head mount 50 undesirably shifts the print heads 20a and 20b (shown in FIGS. 1 and 2) retained by tool-head mount 50 from the intended coordinates in the x-y plane. This results in lower deposition accuracies when building 3D part 24 and support structure 26.

Figure 21:
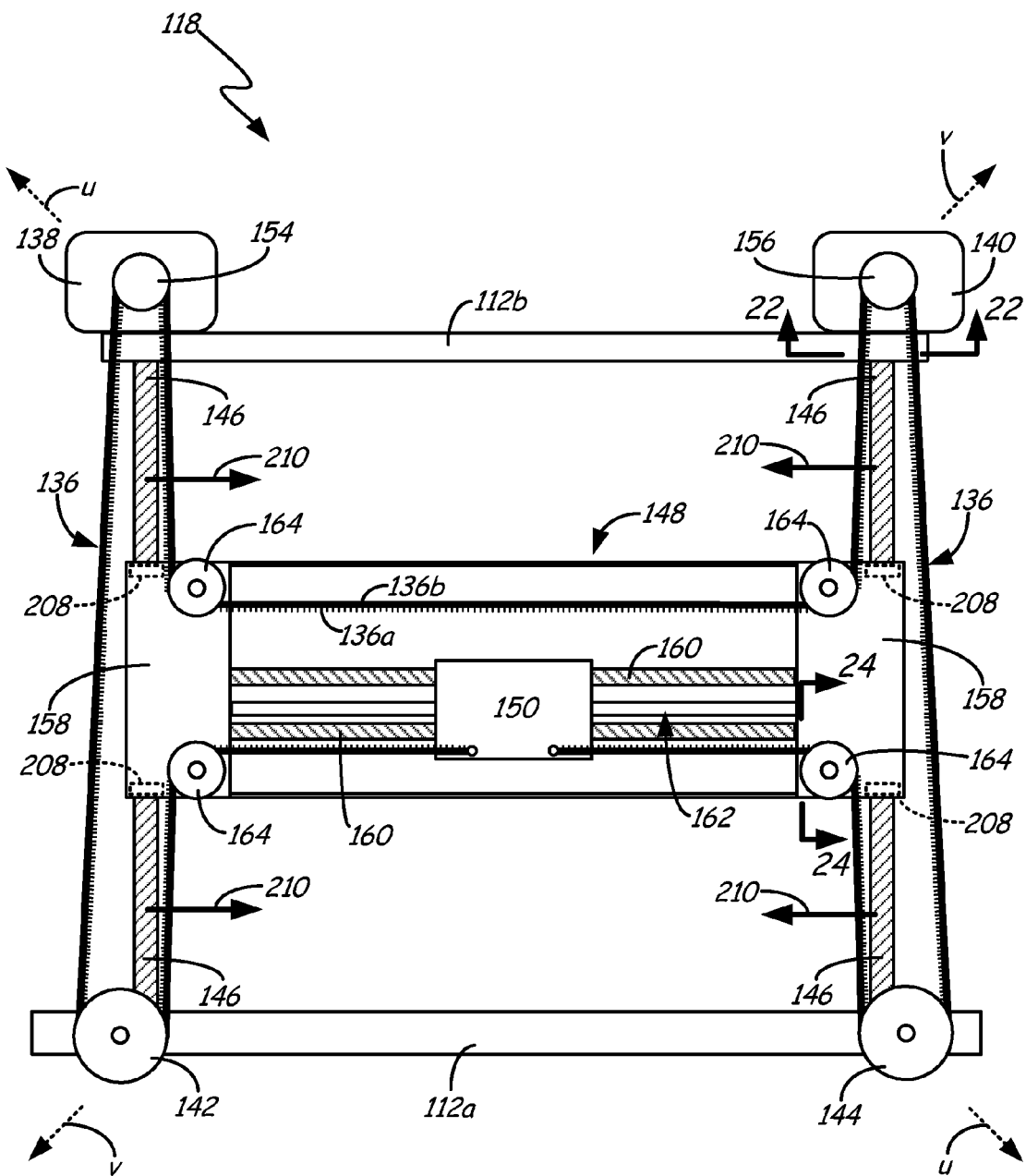
FIG. 21 is a top schematic view of a first alternative gantry assembly of the present disclosure, illustrating features for reducing horizontal pivoting of the carriage and tool-head mount.

FIG. 21 illustrates gantry assembly 118, which is an example of a suitable alternative to gantry assembly 18 (shown in FIGS. 1-20) for reducing or eliminating the pivoting of carriage 148 and tool-head mount 150 in the x-y plane, while also allowing a small amount of float to exist between bearing sleeves 158 and y-axis bearing shafts 146, and between tool-head mount 150 and x-axis bearing shafts 160. Gantry assembly 118 includes the same features as gantry assembly 18, where corresponding reference numbers are increased by "100".

In this embodiment, the bearings of bearing sleeves 158 (referred to as bearings 208, and shown with hidden lines) may be biased along the x-axis to place a load on one or both of y-axis bearing shafts 146 in the directions of arrows 210 (i.e., substantially orthogonal to the longitudinal lengths of y-axis bearing shafts 146). For example, bearing sleeves 158 may include springs (not shown) or other similar biasing components to bias bearings 208, which correspondingly bias y-axis bearing shafts 146 together in the directions of arrows 210.

Figure 22:
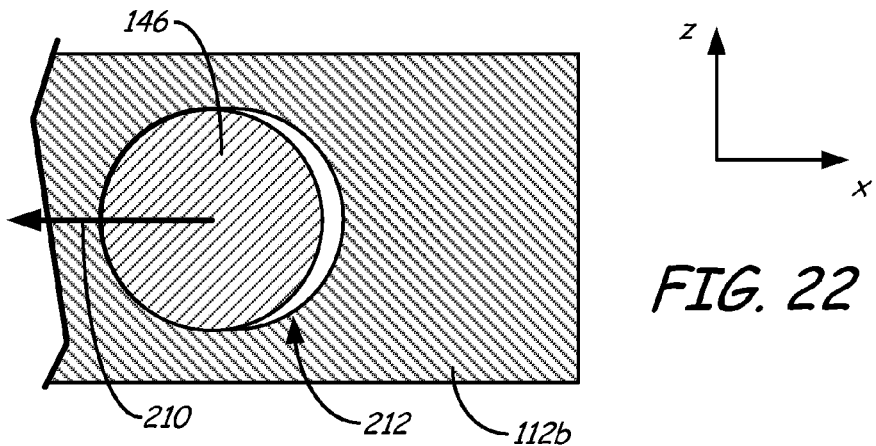
FIG. 22 is a sectional view of Section 22-22 taken in FIG. 21, illustrating an engagement between a y-axis bearing shaft and a receiving slot of a housing frame.

Furthermore, front retention beam 112a and rear retention beam 112b each desirably include receiving slots that are larger than the cross-sectional dimensions of y-axis bearing shafts 146 along the x-axis, at least at the engagement locations with y-axis bearing shafts 146. For example, as shown in FIG. 22, rear retention beam 112b may include receiving slot 212 having dimensions along the x-axis that are greater than the cross-sectional area of y-axis bearing shaft 146. This arrangement provides a small level of float along the x-axis for the engagement between y-axis bearing shaft 146 and receiving slot 212. Front retention beam 112a and rear retention beam 112b desirably include similar receiving slots 212 for each engagement with y-axis bearing shafts 146. The small level of float for each of the engagements between y-axis bearing shafts 146 and receiving slots 212 is suitable for reducing the risk of overloading bearings 208 as carriage 148 moves along the y-axis.

Figure 23:
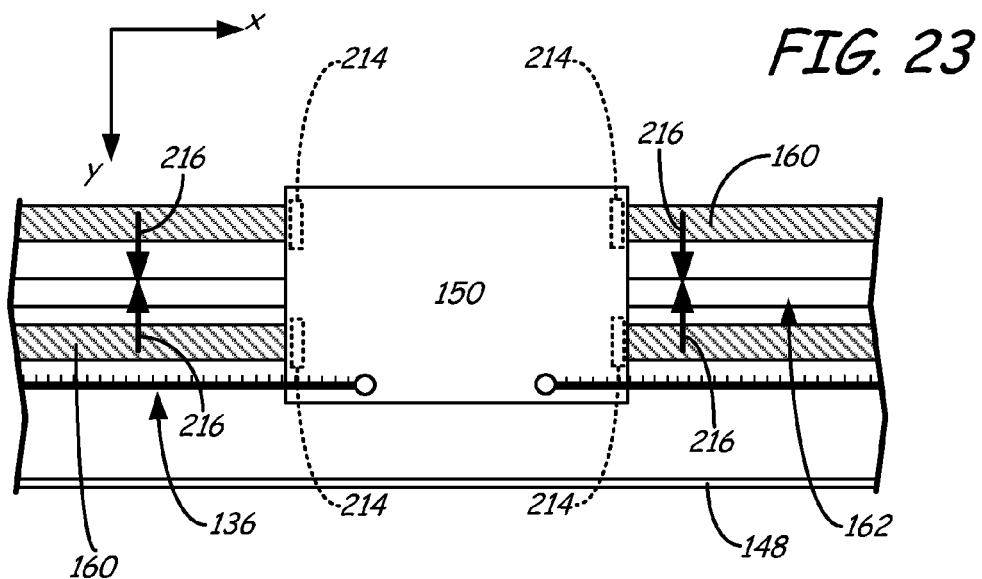
FIG. 23 is an expanded view of an engagement between the tool-head mount and x-axis bearing shafts of the carriage of the first alternative gantry assembly.

Additionally, as shown in FIG. 23, which is an expanded view of the engagement between tool-head mount 150 and x-axis bearing shafts 160, the bearings of tool-head mount 150 (referred to as bearings 214) may be biased along the y-axis to place a load on x-axis bearing shafts 160 in the directions of arrows 216. For example, tool-head mount 150 may include springs (not shown) or other similar biasing components to bias bearings 214 and x-axis bearing shafts 160 together in the directions of arrows 216. Additionally, x-axis bearing shafts 160 may be biased apart with the same end effect of eliminating bearing clearance.

Figure 24:
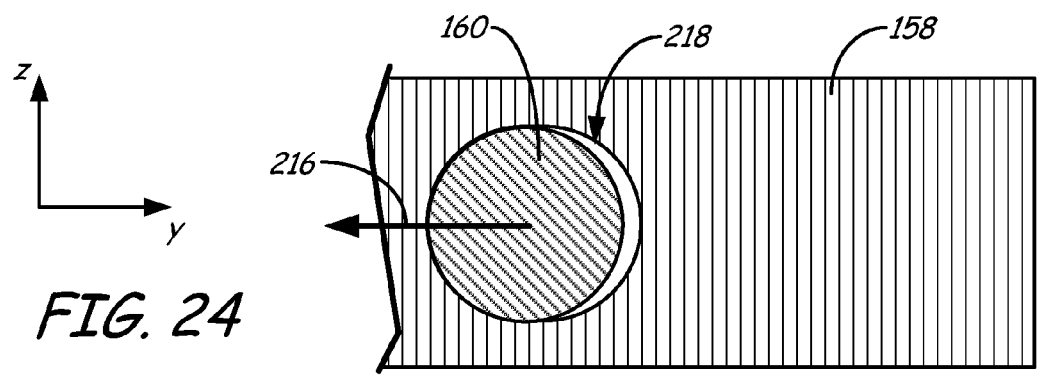
FIG. 24 is a sectional view of Section 24-24 taken in FIG. 21, illustrating an engagement between an x-axis bearing shaft and a receiving slot of a bearing sleeve of the tool-head mount.

Bearing sleeves 158 each also desirably include receiving slots that are larger than the cross-sectional dimensions of x-axis bearing shafts 160 along the y-axis, at least at the engagement locations with x-axis bearing shafts 160. For example, as shown in FIG. 24, bearing sleeve 158 may include receiving slot 218 having dimensions along the y-axis that are greater than the cross-sectional area of x-axis bearing shaft 160. This arrangement provides a small level of float for the engagement between x-axis bearing shaft 160 and receiving slot 218 along the y-axis. Bearing sleeves 158 may include similar receiving slots for each engagement with x-axis bearing shafts 160. The small level of float for each of the engagements between x-axis bearing shaft 160 and receiving slots 218 is beneficial for reducing the risk of overloading bearings 214 as tool-head mount 150 moves along the x-axis.

Gantry assembly 118 is suitable for reducing or eliminating pivotings of carriage 148 and tool-head mount 150 in the x-y plane. Additionally, in some situations, the length of carriage 148 along the x-axis and the quad-arrangement of bearings 208 (shown in FIG. 21) may also cause carriage 148 to pivot partially out of the x-y plane (i.e., along the z-axis). This may also result in lower deposition accuracies when building 3D part 24 and support structure 26.

Figure 25:
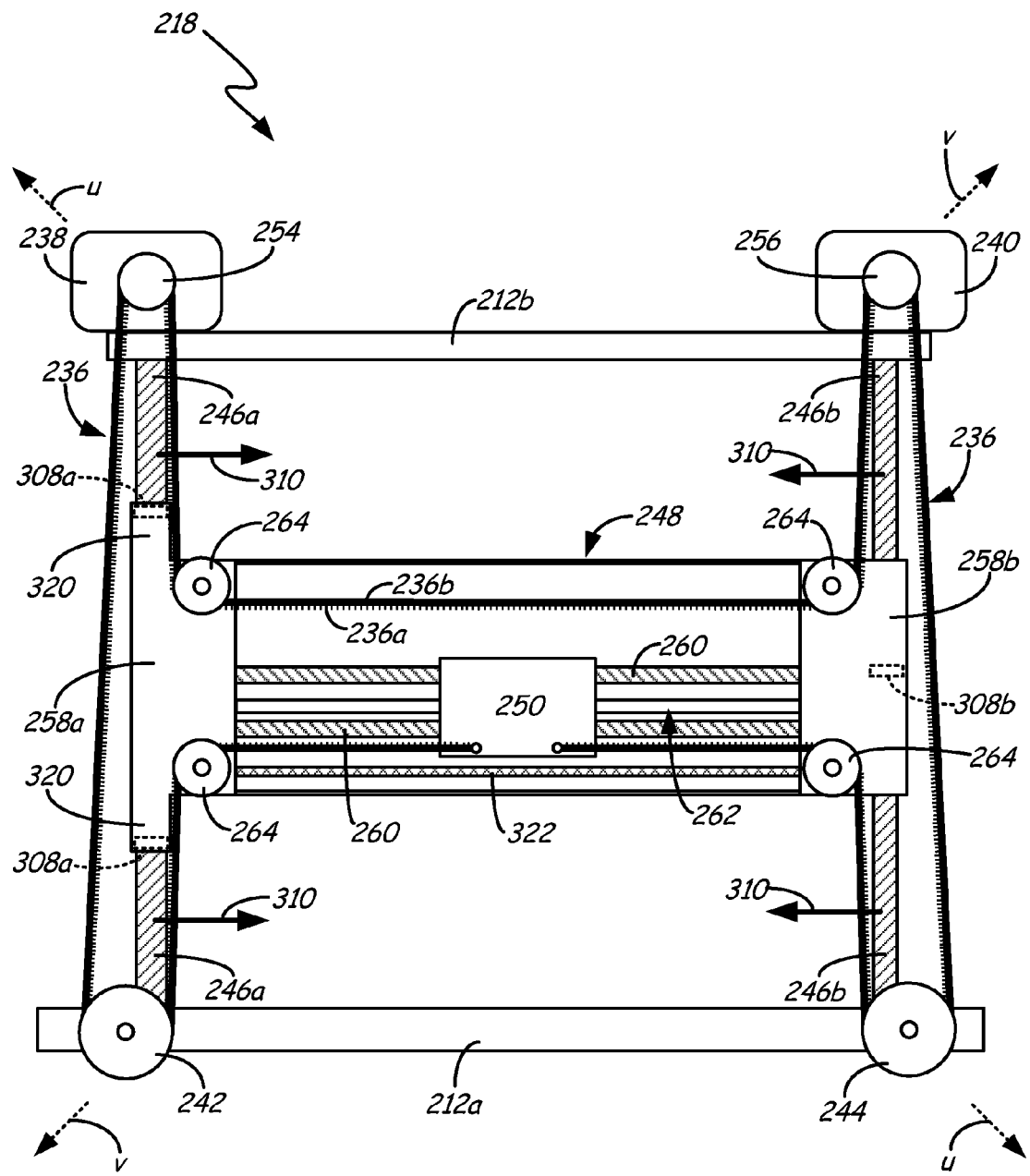
FIG. 25 is a top schematic view of a second alternative gantry assembly of the present disclosure, illustrating features for reducing horizontal and vertical pivoting of the carriage and tool-head mount.

FIG. 25 illustrates gantry assembly 218, which is an example of a suitable alternative to gantry assembly 18 (shown in FIGS. 1-20) and gantry assembly 118 (shown in FIGS. 21-24) for reducing or eliminating the horizontal and vertical pivoting of carriage 248 and tool-head mount 250, while also allowing a small amount of float between the bearing sleeves (referred to as bearing sleeves 258a and 258b) and the y-axis bearing shafts (referred to as y-axis bearing shafts 246a and 246b). Gantry assembly 218 includes the same features as gantry assemblies 18 and 118, where corresponding reference numbers are increased by "200" relative to gantry assembly 18, and by "100" relative to gantry assembly 118.

In this embodiment, bearing sleeve 258a includes extensions 320 that extend along the y-axis to retain a pair of bearings 308a (shown with hidden lines). As such bearings 308a are offset further apart along the y-axis relative to bearings 208 (shown in FIG. 1). Additionally, bearing sleeve 258b only includes a single, centrally-located bearing 308b. The arrangement of bearings 308a at extensions 320 and the centrally-located bearing 308b provides a triangular bearing arrangement that reduces or eliminates vertical pivoting of carriage 248 while drive belt 236 rotates.

Bearings 308a and 308b may also be biased in the same manner as discussed above for gantry assembly 118 to bias y-axis bearing shafts 246a and 246b in the directions of arrows 310. The bearings of tool-head mount 250 (not shown) may also be biased in the same manner as discussed above for gantry assembly 118.

As further shown in FIG. 25, y-axis bearing shaft 246a may have a larger cross-sectional area compared to y-axis bearing shaft 246b to further assist in preventing carriage 248 from pivoting with the use of bearings 308a at extensions 320. For example, y-axis bearing shaft 246a may have a diameter that ranges from about 15% to about 40% greater than the diameter of y-axis bearing shaft 246b, and more desirably from about 20% to about 30% greater than the diameter of y-axis bearing shaft 246b.

In combination with the larger y-axis bearing shaft 246a, carriage 248 also includes torque shaft 322 (shown with sectional hatching for ease of visibility) having opposing ends secured to bearing sleeves 258a and 258b. Torque shaft 322 is suitable for distributing the torque applied to carriage 248 due the triangular bearing arrangement, thereby allowing a single bearing 308b to be used in bearing sleeve 258b without inducing further pivoting in the x-y plane. In an alternative embodiment, bearing sleeve 258b may include additional bearings 308b, such as an array of three bearings 308b. In further alternative embodiments, the arrangements of bearing sleeves 258a and 258b may be switched such that bearing sleeve 258a includes a single, centrally-located bearing 308a, and bearing sleeve 258b includes a pair of bearings 208b at extensions corresponding to extensions 320.

The gantry assemblies of the present disclosure (e.g., gantry assemblies 18, 118, and 218) are suitable for positioning tool heads (e.g., print head assembly 20) at accurate locations in a two-dimensional plane (e.g., the x-y plane above platen 24). For example, gantry assembly 218 may provide positional repeatabilities for tool-head mount 250 of about 0.0005 inches or less in the x-y plane, and more desirably positional repeatabilities of about 0.0003 inches or less. The use of a single drive belt also reduces the complexity of components for the given gantry assembly and provides accurate positioning for a tool head in the x-y plane based on the relative rotational directions and rotational rates of the motor drive shafts (e.g., drive shafts 54 and 56). As such, controller 32 may direct the gantry assemblies 18, 118, or 218 to move print head assembly 20 around in the x-y plane above build chamber 14 to build 3D parts (e.g., 3D part 24) and support structures (e.g., support structure 26) using a layer-based additive manufacturing technique.

Figure 26:
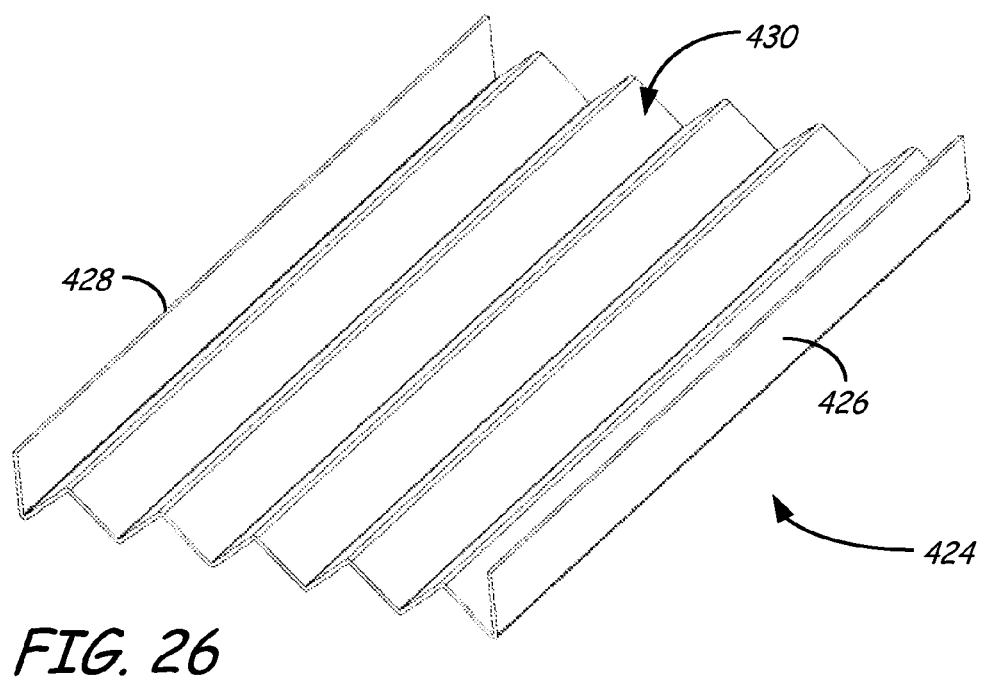
FIG. 26 is a top perspective view of a thermal baffle for use in the additive manufacturing system, where the thermal baffle is biased towards a retracted state.

As discussed above, in one embodiment, the thermal baffles of system 10 (e.g., thermal baffles 28 and 30, shown in FIG. 1) may be fabricated to retract in their free states and to provide good thermal insulation properties. As such, the thermal baffles are each naturally biased towards a retracted or compressed state. As shown in FIG. 26, thermal baffle 424 is an example of a suitable thermal baffle of this embodiment for use as thermal baffle 28 and/or thermal baffle 30.

Thermal baffle 424 includes front edge 426, rear edge 428, and deformable or bellows portion 430, where deformable portion 430 is located between front edge 426 and rear edge 428. When used as thermal baffle 28, front edge 426 may be secured to a front section of housing frame 12, such as at front retention beam 12a. Correspondingly, rear edge 428 may be secured to carriage 48 of gantry assembly 18. Alternatively, when used as thermal baffle 30, front edge 426 may be secured to carriage 48 of gantry assembly 18, and rear edge 428 may be secured to a rear section of housing frame 12, such as at rear retention beam 12b.

Thermal baffle 424 is fabricated from one or more thermally-insulating materials, such as foam-forming materials. Examples of suitable foam-forming materials for thermal baffle 424 include expanded polyolefins (e.g., expanded polypropylene and expanded polyethylene), expanded polystyrene, and combinations thereof. Additional examples of suitable materials for thermal baffle 424 include elastomer materials, such as elastomers commercially available under the trademark "GORALON" from A&A Manufacturing Co., Inc. of New Berlin, Wis. Suitable dimensions for thermal baffle 424 may vary depending on the dimensions of system 10, gantry assembly 18, and print head assembly 20 (shown in FIG. 1).

Figure 27:
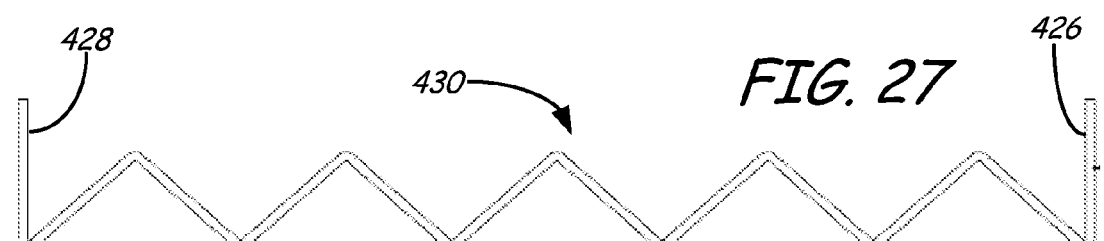
FIG. 27 is a side view of the thermal baffle in a fully expanded state.
Figure 28:
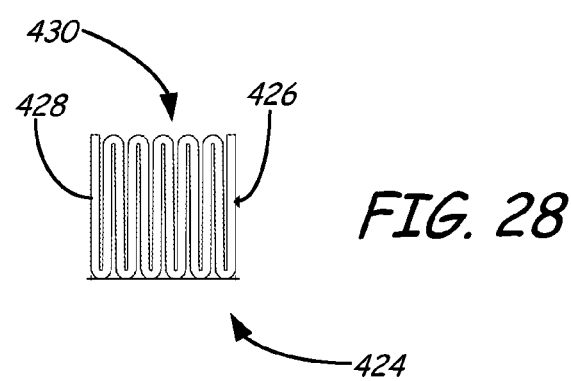
FIG. 28 is a side view of the thermal baffle in a fully compressed state.

To retract in its free state, thermal baffle 424 may be fabricated by initially thermal forming a sheet foam of the material in the expanded state, as shown in FIG. 27. The thermal forming properties may vary depending on the particular material used to fabricate thermal baffle 424. The sheet foam is then compressed in a fixture (not shown) and held at an elevated temperature to cause the material to set in the compressed state, as shown in FIG. 28. Suitable elevation temperatures for setting the material include temperatures above the thermal set point temperature of the given material.

Because the material for thermal baffle 424 is set in the compressed state (e.g., as shown in FIG. 28), the resulting thermal baffle 424 is naturally biased towards a retracted or compressed state, and retracts when no pressure is applied to it (i.e., in its free state). This prevents thermal baffle 424 from buckling when compressed by the movement of print head assembly 20. If the sheet foam were otherwise set in the expanded state, the resulting thermal baffle could buckle (i.e., bunch up in the air) when compressed by the movement of print head assembly 20. The reduction or elimination of buckling accordingly allows thermal baffle 424 to effectively function as good thermal barrier for build chamber 14. This is in addition to the material(s) of thermal baffle 424, which provide good thermal-insulation properties for thermal baffle 424.

Although the present disclosure has been described with reference to preferred embodiments, workers skilled in the art will recognize that changes may be made in form and detail without departing from the spirit and scope of the disclosure.

The invention claimed is:

1. A gantry assembly having a first axis and a second axis that define a plane, the gantry assembly comprising:
   a first bearing shaft extending along the first axis, and operably biased in a direction along the second axis;
   a carriage slidably engaged with the first bearing shaft, and comprising only three bearings;
   a second bearing shaft operably supported by the carriage, wherein the second bearing shaft extends along the second axis and is operably biased in a direction along the first axis;
   a third bearing shaft extending along the first axis substantially parallel to the first bearing shaft, and operably biased in a direction along the second axis such that the first bearing shaft and the second bearing shaft are operably biased toward one another and wherein the only three bearings of the carriage engage the first and third bearing shafts with a triangular bearing arrangement to reduce pivoting of the carriage;
   a tool-head mount slidably engaged with the second, bearing shaft;
   a single drive belt secured to the tool-head mount;
   a first motor having a first drive shaft engaged with the single drive belt; and
   a second motor having a second drive shaft also engaged with the single drive belt, wherein the first motor and the second motor are configured to operate independently to rotate the single drive belt in manners that move the carriage along the first bearing shaft and that move the head-tool mount along the second bearing shaft based on relative rotational directions and rotational rates between the first drive shaft and the second drive shaft, so as to allow movement of the tool-head mount in any direction by a selected combination of movement along the first axis and the second axis in the plane to arrive at any coordinate location within the plane.

2. The gantry assembly of claim 1, and further comprising:
a first pulley engaged with the drive belt, the first pulley being offset along the first axis from the first motor; and
a second pulley engaged with the drive belt, the second pulley being offset along the first axis from the second motor, and offset along the second axis from the first pulley.

3. The gantry assembly of claim 2, and further comprising a plurality of pulleys rotatably mounted to the carriage and engaged with the drive belt.

4. The gantry assembly of claim 1, wherein the first motor is configured to rotate the drive belt in manners that move the tool-head mount in directions along a third axis when the second drive shaft is kept stationary, the third axis being in the plane of the first axis and the second axis, and at an angle to the first axis and the second axis.

5. The gantry assembly of claim 1, wherein the carriage comprises a torque shaft extending along the second axis.

6. The gantry assembly of claim 1, wherein the carriage includes a receiving slot through which the first bearing shaft extends, and wherein the receiving slot has a cross-sectional dimension that is larger than that of the first bearing shaft.

7. The gantry assembly of claim 1, wherein the gantry assembly is configured to reduce vertical pivoting of the carriage out of the plane.

8. The gantry assembly of claim 1, and further comprising at least one collapsible thermal baffle operably coupled to the carriage, wherein the at least one collapsible thermal baffle is naturally biased towards a retracted state.

9. In an additive manufacturing system having a housing frame, a gantry assembly comprising:
a first pair of bearing shafts operably supported by the housing frame and the bearing shafts of the first pair being operably biased toward one another;
a carriage comprising only three bearings that slidably engage the first pair of bearing shafts with a triangular bearing arrangement to reduce pivoting of the carriage, wherein the slidable engagement between carriage and the first pair of bearing shafts biases at least one bearing shaft of the first pair of bearing shafts in a direction that is substantially orthogonal to a longitudinal length of the at least one bearing shaft;
a second pair of bearing shafts operably supported by the carriage, the second pair of bearing shafts being substantially orthogonal to the first pair of bearing shafts and the bearing shafts of the second pair being operably biased toward one another;
a head-tool mount slidably engaged with the second pair of bearing shafts and configured to move along the second pair of bearing shafts wherein movement of the head-tool mount biases at least one bearinshaft of the second pair of bearing shafts in a direction that is substantially orthogonal to a lateral length of the at least one bearing shaft;
a drive belt secured to the head-tool mount;
a first motor operably retained by the housing frame and engaged with the drive belt; and
a second motor operably retained by the housing frame and engaged with the drive belt, wherein the first motor and the second motor are configured to operate independently of each other to rotate the drive belt in manners that move the carriage along the first pair of bearing shafts and that move the head-tool mount along the second pair of bearing shafts based on relative rotational directions and rotational rates between the first drive shaft and the second drive shaft, so as to allow movement of the tool-head mount in a selected direction or combination of directions along the respective bearing shafts to arrive at any coordinate location within a planar workspace wherein the drive belt is the only belt supporting said movement of the tool head to any coordinate location within the planar workspace.

10. The gantry assembly of claim 9, and further comprising:
a first pulley rotatably mounted to the housing frame at a first fixed location, the first pulley being engaged with the drive belt; and
a second pulley mounted to the housing frame at a second fixed location, the second pulley being engaged with the drive belt.

11. The gantry assembly of claim 10, and further comprising a plurality of pulleys rotatably mounted to the carriage and engaged with the drive belt.

12. The gantry assembly of claim 9, wherein the manners in which the first motor and the second motor are configured to operate comprise a first manner in which the first motor rotates the first drive shaft in a first rotational direction and the second motor rotates the second drive shaft in a second rotational direction that is opposite of the first rotational direction, at substantially the same rotational rate as the first drive shaft, to rotate the drive belt in a manner that moves the carriage along the first pair of bearing shafts relative to the housing frame.

13. The gantry assembly of claim 12, wherein the manners in which the first motor and the second motor are configured to operate further comprise a second manner in which the first motor rotates the first drive shaft in a first rotational direction and the second motor rotates the second drive shaft in the first rotational direction, at substantially the same rotational rate as the first drive shaft, to rotate the drive belt in a manner that moves the tool-head mount along the second pair of bearing shafts relative to the carriage.

14. The gantry assembly of claim 9, wherein at least one of the second pair of bearing shafts is biased in a direction that is substantially orthogonal to its longitudinal length.

15. The gantry assembly of claim 9, wherein the carriage comprises a torque shaft extending substantially parallel to the second pair of bearing shafts.

16. A method for operating a gantry assembly in an additive manufacturing system, the method comprising:
providing a single drive belt that is engaged with a first drive shaft of a first motor, a second drive shaft of a second motor, a first pulley, a second pulley, and a plurality of third pulleys, the plurality of third pulleys being rotatably mounted to a carriage that is slidable along a first pair of bearing shafts that extend along a first axis and are operably biased toward one another in a direction orthogonal to a longitudinal length of at least one bearing shaft of the first pair of bearing shafts, wherein the carriage comprising only three bearings that engage the first pair of bearing shafts with a triangular bearing arrangement to reduce pivoting of the carriage, and wherein the single drive belt is also secured to a tool-head mount that is supported by the carriage and that is slidable along a second pair of bearing shafts that are supported by the carriage and extend along a second axis that is substantially orthogonal to the first axis and the second pair of bearing shafts being operably biased toward one another in a direction orthogonal to a lateral length of at least one bearing shaft in the second pair of bearing shafts;

selectively operating the first drive motor and the second drive motor independently of each other to rotate the single drive belt in manners that move the carriage in directions along the first axis, that move the tool-head mount in directions along the second axis relative to the carriage, or combinations thereof, so as to move the tool-head mount in selected directions along each axis to any desired coordinate location within a plane defined by the first axis and the second axis;

biasing at least one of the first bearing shafts substantially along the second axis while selectively operating the first drive motor and the second drive motor; and biasing at least one of the second bearing shafts substantially along the first axis while selectively operating the first drive motor and the second drive motor.

17. The method of claim 16, wherein the rotation of the drive belt moves the carriage along the first pair of bearing shafts, and moves the tool-head mount along the second pair of bearing shafts.

18. The method of claim 17, wherein selectively operating the first motor and the second motor independently of each other to rotate the drive belt comprises rotating the first drive shaft of the first motor and keeping the second drive shaft of the second motor stationary, and wherein the rotation of the drive belt moves the tool-head mount in a direction that is in a plane of the first axis and the second axis, and that is at an angle to the first axis and to the second axis.

* * * * *